(12) United States Patent
Enis et al.

(10) Patent No.: US 7,856,843 B2
(45) Date of Patent: Dec. 28, 2010

(54) THERMAL ENERGY STORAGE SYSTEM USING COMPRESSED AIR ENERGY AND/OR CHILLED WATER FROM DESALINATION PROCESSES

(76) Inventors: Ben M. Enis, 1231 Panini Dr., Henderson, NV (US) 89052; Paul Lieberman, 19815 Mildred Ave., Torrance, CA (US) 90503

( * ) Notice: Subject to any disclaimer, the term of this patent is extended or adjusted under 35 U.S.C. 154(b) by 661 days.

(21) Appl. No.: 11/585,023

(22) Filed: Oct. 23, 2006

(65) Prior Publication Data

US 2007/0234749 A1 Oct. 11, 2007

Related U.S. Application Data

(60) Provisional application No. 60/789,415, filed on Apr. 5, 2006, provisional application No. 60/794,190, filed on Apr. 21, 2006, provisional application No. 60/832,777, filed on Jul. 24, 2006.

(51) Int. Cl.
F25D 9/00 (2006.01)
(52) U.S. Cl. .............................. 62/401; 62/430; 62/434; 62/235.1; 62/532; 62/533
(58) Field of Classification Search ................... 62/430, 62/434, 235.1, 401, 532, 533
See application file for complete search history.

(56) References Cited

U.S. PATENT DOCUMENTS

| | | | |
|---|---|---|---|
| 3,178,900 A | 4/1965 | Saunders | |
| 3,251,192 A | 5/1966 | Rich et al. | |
| 3,314,881 A | 4/1967 | Tuwiner | |
| 3,356,591 A | 12/1967 | Peterson | |
| 3,367,123 A | 2/1968 | Schambra | |
| 3,443,303 A | 5/1969 | Goldberg | |
| 3,501,924 A | 3/1970 | Ashley | |
| 3,587,859 A | 6/1971 | Probestein et al. | |
| 3,885,399 A | 5/1975 | Campbell | |
| 3,992,900 A | 11/1976 | Campbell | |
| 4,091,635 A | 5/1978 | Ogman | |
| 4,319,964 A | 3/1982 | Katz et al. | |
| 4,323,424 A | 4/1982 | Secunda et al. | |
| 4,356,015 A | 10/1982 | Oliver | |

(Continued)

OTHER PUBLICATIONS

Gao, Partial freezing by spraying as a treatment alternative of selected industrial wastes, National Library of Canada, Univ. of Alberta, Fall 1998.

(Continued)

*Primary Examiner*—William E Tapolcai
*Assistant Examiner*—Jonathan Koagel
(74) *Attorney, Agent, or Firm*—J. John Shimazaki

(57) ABSTRACT

The invention relates to a universal system for producing cost effective energy particularly for cooling purposes. In one embodiment, wind turbines are used to generate electricity and compressed air energy, wherein the compressed air energy is used to co-generate electricity and chilled air. The chilled air is then used to chill water in either a mixing chamber, or a desalination system, wherein the chilled water is stored in a separation tank, wherein it can later be used to provide cooling for an air conditioning system for a facility. When desalination is used, the system produces chilled fresh drinking water which can be used for air conditioning, and then used as fresh drinking water. Any exhaust chilled air can be used directly for air conditioning.

21 Claims, 20 Drawing Sheets

U.S. PATENT DOCUMENTS

| | | | |
|---|---|---|---|
| 4,406,748 A | | 9/1983 | Hoffman |
| 4,455,834 A | * | 6/1984 | Earle .................. 60/659 |
| 4,838,039 A | * | 6/1989 | Knodel ................ 62/330 |
| 5,059,228 A | * | 10/1991 | Cheng ................. 62/532 |
| 5,207,928 A | | 5/1993 | Lerner |
| 5,379,589 A | * | 1/1995 | Cohn et al. ........... 60/39.59 |
| 5,400,619 A | * | 3/1995 | Husseiny et al. ....... 62/532 |
| 5,465,585 A | * | 11/1995 | Mornhed et al. ....... 62/59 |
| 5,575,160 A | | 11/1996 | Keus |
| 5,655,377 A | | 8/1997 | Mornhed |
| 6,299,735 B1 | | 10/2001 | Lumbreras |
| 6,305,189 B1 | | 10/2001 | Menin |
| 6,668,555 B1 | * | 12/2003 | Moriarty .............. 60/641.8 |
| 6,994,156 B2 | | 2/2006 | Kopko |
| 2004/0148934 A1 | * | 8/2004 | Pinkerton et al. ....... 60/646 |

OTHER PUBLICATIONS

Cho et al., NMR investigation of the quasi-brine layer in ice/brine mixtures, J. Phys. Chem. B, Feb. 2002, pp. 11,226-232, Pacific Northwest National Laboratory.

Wilf, Application of RO desalting technology for potable water production in USA, date unknown, Hydranautics, www.membranes.com.

Koop et al., Phase transitions of sea-salt/water mixtures at low temperatures . . . , Journal of Geophysical Research, Nov. 2000, vol. 105, pp. 26,393-402, MIT, Cambridge, MA.

Seekler et al., Application of eutectic freeze crystalization to process streams . . . , Deft University/Energy and Process Innovation, 2002, The Netherlands.

Eksperiandova et al., Distribution of impurities during low temperature . . . , J. Solution Chem., Jun. 2006, pp. 1075-1084, National Academy of Sciences, Ukraine.

* cited by examiner

Eutectic Freeze Crystallizer

| RECIPROCATING COMPRESSOR | PRESSURE (PSIA) | TEMPERATURE (DEG F) | DENSITY (#/CU FT) | ENTHALPY (BTU/#) | ENTROPY (BTU/(# R)) |
|---|---|---|---|---|---|
| INPUT | 14.67 | 70 | 0.074764 | 126.71 | 1.6366 |
| ISENTROPIC | 90 | 426.44 | 0.27351 | 213.05 | 1.6366 |
| | | | | -86.34 | |
| EFFICIENCY | | | | 0.84 | |
| OUTPUT | 90 | 492.95 | 0.25438 | 229.5 | 1.6545 |
| | | | | -102.79 | |

| CENTRIFUGAL COMPRESSOR | PRESSURE (PSIA) | TEMPERATURE (DEG F) | DENSITY (#/CU FT) | ENTHALPY (BTU/#) | ENTROPY (BTU/(# R)) |
|---|---|---|---|---|---|
| INPUT | 85 | 70 | 0.43391 | 126.22 | 1.5153 |
| ISENTROPIC | 205 | 222.06 | 0.80974 | 162.64 | 1.5153 |
| | | | | -36.42 | |
| EFFICIENCY | | | | 0.84 | |
| OUTPUT | 205 | 250.4 | 0.77695 | 169.58 | 1.5253 |
| | | | | -43.36 | |

| TURBOEXPANDER | PRESSURE (PSIA) | TEMPERATURE (DEG F) | DENSITY (#/CU FT) | ENTHALPY (BTU/#) | ENTROPY (BTU/(# R)) |
|---|---|---|---|---|---|
| INPUT | 200 | 70 | 1.0235 | 125.42 | 1.4552 |
| ISENTROPIC | 31.5 | -148.87 | 0.27586 | 73.734 | 1.4552 |
| | | | | 51.686 | |
| EFFICIENCY | | | | 0.84 | |
| OUTPUT | 31.5 | -114.78 | 0.24795 | 82.004 | 1.4804 |
| | | | | 43.41624 | |

FIGURE 2b

| | HP | SCFM |
|---|---|---|
| RECIPRO. COMPRESSOR | 2,000.0 | 10,857.6 |
| TURBO COMPRESSOR | 844.3 | 10,857.6 |
| TURBO EXPANDER | 844.3 | 10,857.6 |

FIGURE 2c

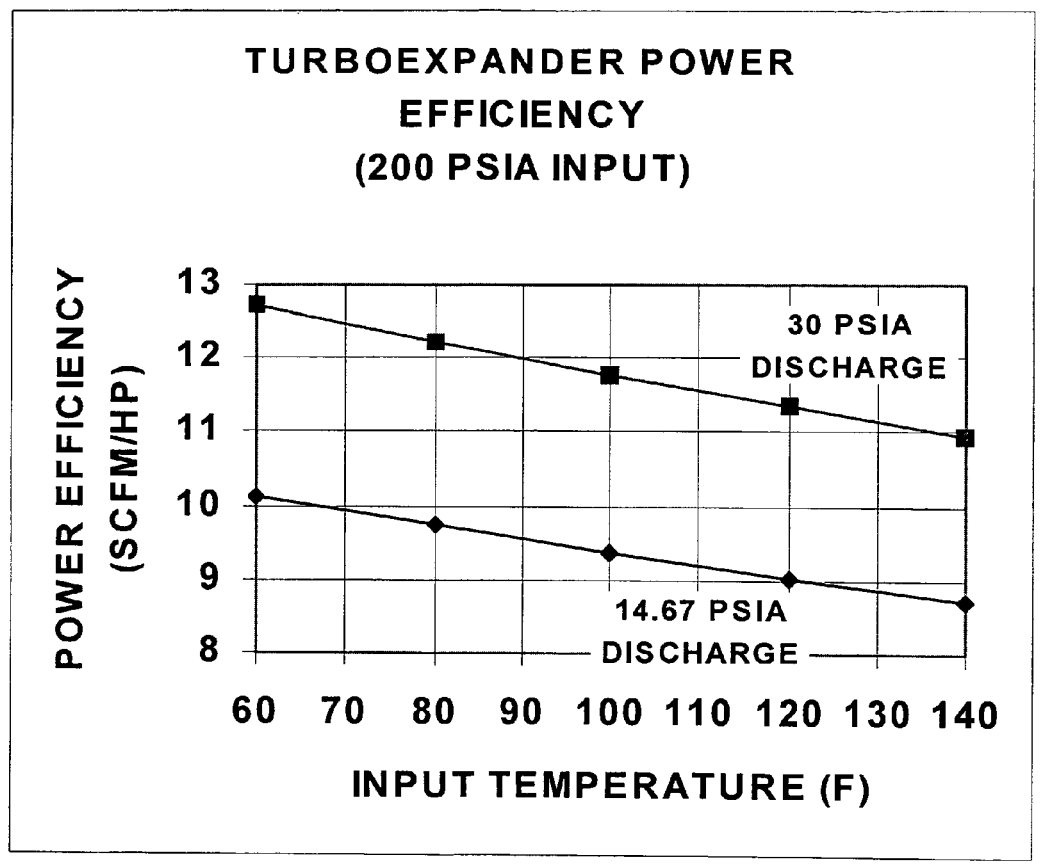
Figure 2d. Airflow requirements to produce unit power by a turboexpander with 85% thermodynamic efficiency.

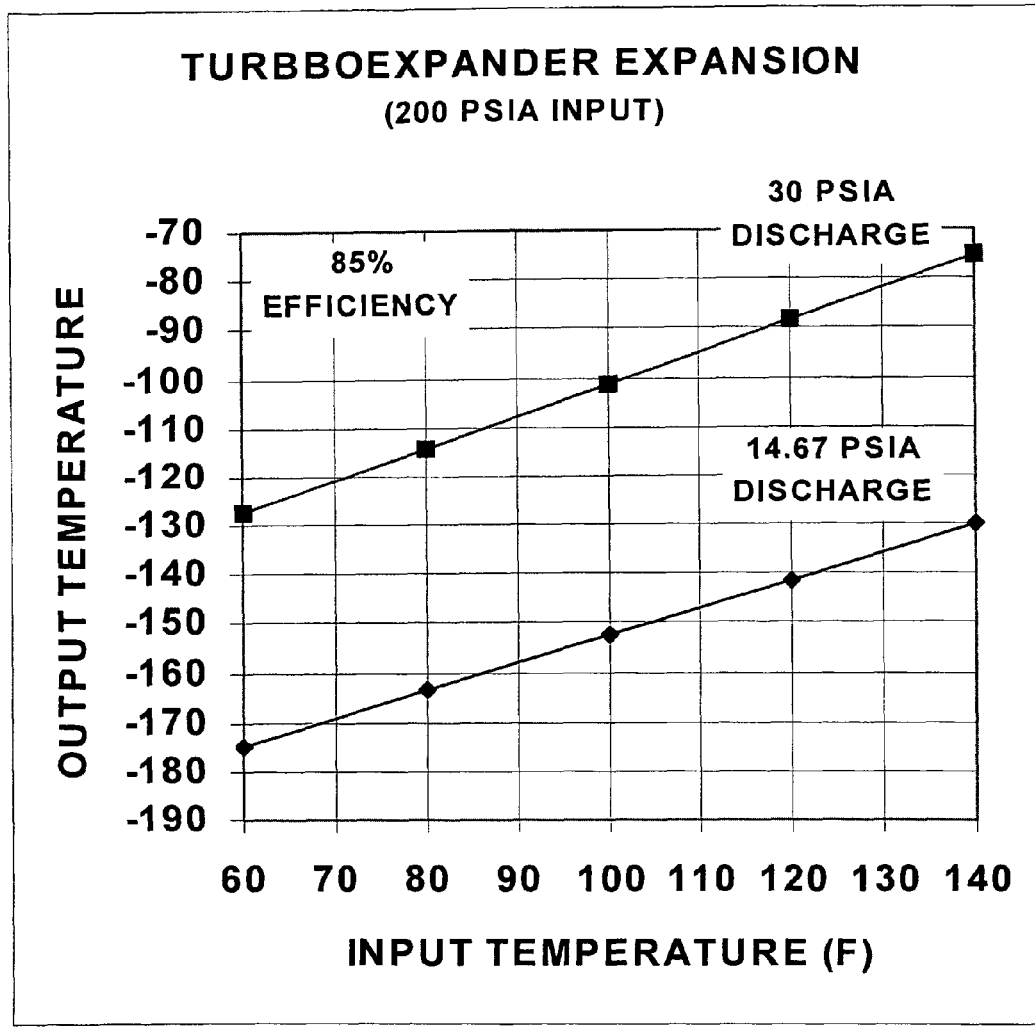
Figure 2e. Air discharge temperature for a range of input temperatures across a turboexpander with 85% thermodynamic efficiency.

Wind Turbine Generator with Generation of Electrical Power and Co-Generation of Chilled Air When Storage Tank is Full
• Storage Tank or Long Storage Pipeline
• For Immediate Air Conditioning and/or Thermal Energy Storage (Delayed Air Conditioning)

THERMAL ENERGY STORAGE SYSTEM USING COMPRESSED AIR ENERGY AND/OR CHILLED WATER FROM DESALINATION PROCESSES

RELATED APPLICATIONS

This application claims the benefit of the filing dates of U.S. provisional application No. 60/789,415, filed Apr. 5, 2006, 60/794,190, filed Apr. 21, 2006, and 60/832,777, filed Jul. 24, 2006, which are all incorporated herein by reference.

BACKGROUND OF THE INVENTION

In many areas of the country, air conditioning needs are significant, especially during summer months. In some states, such as Florida and Texas, and others in the south, those needs are significant throughout most of the year. Not only do high outdoor temperatures affect indoor temperatures whenever large windows are used, but there is typically a substantially increased need for cooling to offset the greenhouse effect that can cause heat to be trapped inside. In areas where the climate is warm, the demand for air conditioning can cause a significant portion of the energy costs to be devoted to air conditioning needs, i.e., air conditioning can become a significant factor and/or percentage of the entire energy costs, and therefore, the cost of keeping a home or business cool can become a heavy burden.

Another problem associated with keeping buildings cool is that the energy demand often peaks during the daytime hours, which, in turn, increases the energy rates during those hours. That is, air conditioning needs are typically highest during the day, which is when the sun is shining, and the outdoor temperatures are at their highest, but which is also when most businesses are operating, such that, they tend to drive up the energy rates during those periods, which is when the energy is needed most. Many utility companies charge more during the peak daytime periods, to offset the higher demand and therefore cost of supplying energy during those periods. This is especially true during the warmest summer months. During the winter months, when heating needs are greater than cooling needs, the correlation between the two isn't quite as acute. During the winter months, it is usually warmer during the day than during the night, and therefore, the overall energy needs during the day are not quite as high, as they are during the summer. Nevertheless, to the extent the cost of energy is higher during the highest demand periods, the cost of maintaining comfortable temperatures in the home or business can be tremendously high.

Due to these problems, attempts have been made in the past to develop and implement cost-saving systems that use alternative energy sources to reduce the overall cost of energy during the high demand periods. For example, solar energy systems have been developed and used to provide extra heating for homes and businesses. Nevertheless, energy derived from the sun, by its very nature, cannot normally be efficiently used for cooling purposes. Although solar energy can be converted into electricity, and then, the electricity can be used to power an air conditioning system, the cost of converting the solar energy to produce electricity to do so can be prohibitively high.

Past systems have also incorporated other natural alternative energy sources, such as the wind, to generate electricity, which can then be used for both heating and cooling. The difficulty of using wind, however, is that the wind may not always blow when the demand exists. For example, the wind can be unpredictable, and uncertain, wherein the wind may not blow with sufficient force and regularity during the times when energy is needed most. In fact, in many cases, the wind may blow harder and more consistently at night, whereas, the need for energy, as discussed above, may be greatest during the day.

To resolve these issues, attempts have been made in the past to store the energy generated by wind, so that it can be used later, when it is needed most. Past attempts include the use of small wind turbine generators in the order of 10 to 50 kW power which use batteries to store energy during excess wind power periods to compensate for when wind power is deficient. There are also projects designed to store wind energy in underground caverns, in the form of compressed air energy, which use supplementary combustion to improve electrical power output. Despite some advantages of these past systems, which attempt to store wind-generated energy, they also have certain shortcomings, making them difficult or inefficient to use.

One type of air conditioning system that is in current use and has been relatively successful in lowering energy costs is a thermal energy storage system (TES). In this system, water is typically chilled during times when electricity rates are relatively low, and then, the chilled water is stored in large storage tanks so that the chilled water can be used later to provide cooling for an air conditioning system, i.e., when electricity rates are relatively high. The system chills the water when energy rates are relatively low, such as at night, and then stores it in a water temperature stratified tank, so that later, when it is most needed, i.e., during peak daytime hours, it can be used to provide cooling for the associated facility. This enables the facility to consume electrical energy from the utility power grid during relatively low-cost energy periods, i.e., at night, and then use the energy to cool the facility during relatively high-cost energy periods, i.e., the day, wherein overall energy costs can be reduced.

One of the drawbacks of these systems, however, is that the energy must be purchased directly from the utility companies, notwithstanding that it can be purchased at a lower rate during off-peak hours. For these reasons, an improved method and system is needed that can be used to provide cooling for an air conditioning system, which can not only be operated during peak daytime hours, but which is able to further reduce the end user cost and overall usage of energy.

SUMMARY OF THE INVENTION

The present invention relates to an improved cooling method and system capable of reducing the end-user cost of energy, comprising an air conditioning system adapted to operate in conjunction with a thermal energy storage system, and/or a compressed air energy storage system.

In one embodiment, the air conditioning system is preferably adapted to operate in conjunction with a compressed air energy system, which preferably has a compressor and a compressed air storage tank, capable of storing energy in the form of compressed air for an extended period of time. In this embodiment, the energy that drives the compressor is preferably, but not necessarily, generated by one or more wind turbines, which can be strategically located, and adapted, so that they can generate wind energy efficiently and produce energy for the compressor on a consistent basis. The wind turbine can be provided with a generator which can generate electricity, wherein the electricity can be used immediately by any associated facility, user or grid. The nature of the wind turbines enables the wind energy to be produced when the wind is most available, such as at night, or any other time when the wind consistently blows, and then stored for later use.

The preferred system preferably has a turbo expander to release the compressed air energy at the appropriate time, such that when the compressed air is released, the energy generated can be used in the form of either 1) electricity produced by a generator operated in connection with the compressed air energy system, or 2) chilled air generated as a by-product when the compressed air is released. These two forms of energy are preferably produced on a co-generative basis, so that one, or the other, or both, can be efficiently utilized at any given time. In this respect, consider that the compressed air energy storage system generates electricity at a relatively low efficiency rate, i.e., of close to about 30%. On the other hand, by co-generating both electricity and chilled air at the same time, and using the chilled air for secondary purposes, as will be discussed, the efficiency rate of the system can be boosted to a much higher rate, i.e., up to more than about 60%, which is desirable.

In this embodiment, the chilled air which is produced as compressed air is released can be used for additional cooling purposes, such as for air conditioning, and/or desalination, as will be discussed. Furthermore, this embodiment of the system is preferably able to delay the time when the chilled water is to be used, which can be at a more opportune time. For example, in one variation of the embodiment, energy can be stored in the compressed air energy storage tank, in the form of compressed air, so that it can be used later, i.e., when the energy is needed, and/or when the time is more convenient. In a second variation of the embodiment, instead of storing compressed air energy first, compressed air energy can be released immediately, as it is being compressed, without storing it first. In either case, the expanded air, which is produced when the compressed air is released, can be used to produce not only electricity, but also chilled air, which can be used to produce chilled water, wherein the chilled water can then be stored in a separation (stratified temperature) tank, wherein the energy can be stored in the form of chilled water, rather than compressed air, until it is needed. In a third variation, the system can be adapted to do both, depending on the needs of the system, i.e., some of the compressed air energy can be stored for later use, and some of it can be used immediately without storing it first, to produce chilled water which can then be stored in the separation tank.

In this embodiment, one of the secondary purposes for which the chilled air from the turbo expander can be used is to purify water, using a desalination system, such as those described in the above-identified U.S. provisional applications, which are incorporated herein by reference in their entirety.

The desalination system of the present invention is preferably adapted to remove salt and other impurities from seawater or from brackish water or other impure forms of water (hereinafter collectively referred to as "seawater"). In this embodiment, the desalination system preferably comprises a crystallization chamber, which can be used to remove salt and other impurities, wherein purified water can be produced thereby. The desalination system preferably injects seawater into the crystallization chamber, preferably in the form of a mist, or spray, wherein the chilled air from the turbo expander is preferably introduced into the chamber, thereby exposing the mist or spray to very cold air. This causes the seawater droplets to be super chilled far below −6° F., and flash frozen, thereby forming super cooled ice particles, such as at the top of the crystallization chamber, but can reach an equilibrium temperature of about −6° F. as they drop onto the bottom of the chamber. The freezing of the seawater enables buoyant pure water ice particles to be formed, leaving behind the salt and other impurities that are left in a relatively dense salty brine at the bottom of the chamber.

The separation process of the low density fresh water solid ice particles from the high density liquid salt brine can occur (1) by gravity and (2) as assisted by the addition of fresh water in the crystallization chamber that displaces the viscous salt brine that attaches itself in a layer around each ice particle. The fresh water freezes onto the brine coated ice particles displacing the brine into the gravity flow and this added water, which is frozen by the batch, is later recovered for reuse. The parameters for the water addition are identical to those used in conventional wash columns, except that this water is sprayed onto the ice formation as the droplets fall to the bottom, layer by layer.

Together, the super chilled ice particles and salty brine result in a mixture with a temperature of about minus 6 degrees F., wherein the low-density fresh water ice particles float within the concentrated brine containing the undesired salts and other impurities. Most of the liquid brine is removed by drainage. Any remaining liquid brine coating the ice particles can be further removed in a conventional wash column.

Thus the desalination system has means for separating the ice particles from the salty brine, to make sure that any left over salt or other impurity is removed from the ice particles. When the ice particles are melted, only purified water remains. These ice particles (cooled to slightly warmer than minus 6 degrees F. to assure the formation of the solid ice phase and liquid brine phase) are preferably distributed into a small holding tank, or other container, and mixed with additional fresh water, such as water that had previously been purified by the system (which can be at room temperature), and then allowed to melt. By mixing the super cooled ice particles with the additional water, the system is able to produce very cold fresh drinking water, i.e., at or near freezing temperatures. For example, in connection with the thermal energy storage system, as will be discussed, the final temperature is preferably about plus 40 degrees F. for input into the separation tank, although for other purposes the water can be in the neighborhood of plus 32 degrees F. to plus 60 degrees F. or higher, if necessary.

The chilled fresh water resulting from the desalination system can then be distributed to a thermal energy storage system, wherein, it can be stored, and then, at the appropriate time, used to provide cooling for the air conditioning system, which can then be used to cool the facility, as will be discussed. In this last respect, the preferred embodiment preferably comprises a separation or stratification tank, into which the chilled purified water from the crystallization chamber can be distributed and stored. By providing a separation tank, the coldest water will remain at the bottom of the tank, and the relatively warm water will stay at the top of the tank, such that the coldest water can be withdrawn from the bottom and used by the air conditioning system, i.e., when the need for air conditioning is highest. By keeping the water in the separation tank relatively still, the cold and warm water will remain stratified, wherein the coldest water can then be made available at the bottom, and used to provide cooling for the air conditioning system. The relatively warm water on top can also be made available as drinking water, or for use in the wash column in the desalination system, to name a few.

The air conditioning system preferably has tubes and/or coils through which the chilled water from the separation tank can be piped. This way, the chilled water can pass through the inside of the tubes and/or coils, which are located in the central air conditioning chamber, such that air circulating within the chamber can be cooled via heat exchange. That is, as the air is passed through, and over the chilled tubes and/or coils, the relatively warm air surrounding the relatively cool tubes and/or coils will become chilled, and can then be distributed throughout the facility, such as through a ventilation system, to provide cooling air to the facility or other user. The chilled air from the turbo expander, which exits from the crystallization chamber, can also be used to provide cool air for the facility directly. The chilled water can also be distributed to other neighboring facilities, in the form of chilled water, such as through a network of insulated pipes, wherein the system can be expanded, to provide additional cooling capabilities, for additional facilities nearby. Because the system preferably uses fresh water from the desalination system as the chilling medium, the water is then preferably distributed back from the air conditioning system, to be distributed as fresh drinking water, for use at the facility, or for any other purpose.

While a conventional TES normally operates in a closed loop so that no water is added or removed from the system, this is not the case with the desalination system. For example, in a conventional TES, cold water is circulated in one direction from the bottom of the stratification tank to a remotely located HVAC system to chill air, wherein after the cold water has passed through the heat exchange coils, the relatively warm water is returned to the top of the stratification tank. The system can also circulate the relatively warm water in a reverse direction, from the top of the stratification tank to the remotely located HVAC system to warm air, wherein after the warm water has passed through the heat exchanger coils, the relatively cool water is returned to the bottom of the stratification tank.

However, in the desalination embodiment of the present invention, chilled fresh drinking water is produced in the crystallization chamber (and wash column), which can then be added to the separation tank, so it is not desirable to operate the system in a closed loop. Rather, it is desirable to remove the fresh water after it has passed through the air conditioning system, and returned to the facility, so that it can be used as fresh drinking water. Thus there is a need for a sensor and logic circuit that assures that the separation tank remains full, such as a system that separately stores any excess chilled water that is produced, or one that automatically turns off when the separation tank is full.

In this embodiment, the following are the two inputs into the system that are required: 1) wind energy to be captured by wind turbines, and 2) seawater for the desalination system. In addition to immediate electricity output from the wind turbine generator, the following are the possible outputs which can be provided, on a time-delayed basis, so that they can be used when they are most needed: 1) electricity generated by compressed air being released by the turbo expander, 2) chilled air generated by compressed air being released by the turbo expander, 3) purified water produced by using the chilled air released by the turbo expander in the crystallization chamber for purification purposes, 4) chilled fresh water produced by the desalination system which is stored in the separation tank, 5) chilled air which can be produced by passing the chilled fresh water from the separation tank through tubes and/or coils in the air conditioning system, and 6) recovery of salt water brine containing salt and other impurities, minerals, etc. In addition, the system produces cool exhaust air when the chilled air is released by the turbo expander, which begins at between minus 120 degrees F. and minus 175 degrees F., and is used for desalination, which results in chilled air at a temperature of about minus 6 degrees F. This system preferably uses one of two different storage means, or both, to delay the use of energy from the time it is available to the time it is needed, including 1) the compressed air energy storage system, which can store energy in the form of compressed air, and/or 2) the separation (stratified water temperature) tank, which can store energy in the form of chilled water. By being able to provide the above outputs, on a time delayed basis, by using only the two inputs, and the two storage mediums described above, the preferred embodiment is able to significantly increase the overall efficiency of the system.

In an alternate embodiment, where fresh water is used, and/or where there is no need for desalination of seawater, a mixing chamber and a separation tank for holding fresh water or other liquid can be used instead of the crystallization chamber described above. In such case, the chilled air from the turbo expander is preferably distributed into the mixing chamber, wherein means for introducing the chilled air into the mixing chamber is preferably provided. For example, this can be done by injecting the chilled air as tiny bubbles and passing the bubbles into the mixing chamber from underneath. The water or liquid in the mixing chamber is thereby circulated and chilled by the chilled air. The chilled water or liquid in the mixing chamber can then be distributed into the separation tank, where it can be stored, and then used later, as discussed above, by the air conditioning system.

In this case, the separation tank preferably has an upper portion, and a lower portion, wherein chilled water from the mixing chamber can be introduced into the lower portion of the tank. This way, when chilled water is needed to provide cooling for the air conditioning system, the chilled water can be withdrawn from the lower portion of the separation tank, and then distributed to the air conditioner, which can then be used to cool the air. By keeping the water in the separation tank relatively still, and keeping the flow of water into and out of the tank relatively slow, chilled water will remain at the bottom of the tank, and the relatively warm water will remain at the top of the tank.

Preferably, in this embodiment, the system forms a closed loop, and the upper portion of the separation tank has an upper inlet and an upper outlet, and the lower portion has a lower inlet and a lower outlet. This way, the chilled water from the mixing chamber can be distributed into the lower portion of the separation tank, through the lower inlet, and then stored. Then, when needed, chilled water from the separation tank can be withdrawn from the lower portion of the separation tank, through the lower outlet, to provide cooling for the air conditioning system. Then, after the chilled water has passed through the air conditioning system, and heat has been exchanged, the relatively warm water from the air conditioning system can be circulated back to the upper portion of the separation tank, through the upper inlet, where the water can be stored again. Finally, at the appropriate time, the relatively warm water from the upper portion of the separation tank can be circulated back to the mixing chamber, through the upper outlet, so that it can be re-chilled, to start the cycle again.

When there is heating required at the site containing the heat exchanger coils, the circulation from the separation tank can be reversed so that warm water from the top of the separation tank is transferred to the heat exchanger coils to heat the coils and the HVAC air. The cold air passing over the heat exchanger coils chills the water that is returned to the bottom of the separation tank. When the cold water and hot water interface arrives at the top of the separation tank, the process is interrupted. When cold water from the mixing chamber is added to the bottom of the separation tank, the same quantity of warm water must be drawn from the top of the separation tank to accommodate the fixed volume of the separation tank.

The separation tank volume is sized so that there is sufficient chilled water to supply the cooling air conditioning needs during the daytime.

In this embodiment, the following inputs are needed: 1) wind energy to be captured by wind turbines, and 2) water or liquid from any source. In addition to the immediate electricity output produced by the wind turbine generator, the following are the possible outputs which can be provided, on a time-delayed basis, so that they can be used when they are most needed: 1) electricity generated by compressed air being released by the turbo expander, 2) chilled air generated by compressed air being released by the turbo expander, 3) chilled water or liquid produced by the chilled air being released by the turbo expander, which is produced by passing the chilled air through the mixing chamber, wherein the chilled water or liquid is stored at the bottom of the separation tank, and 4) chilled air at the facility which can be produced by passing the chilled water or liquid from the bottom of the separation tank through the pipes and/or coils in the air conditioning system. In addition, the system produces cool exhaust air when the chilled air which begins at between minus 120 degrees F. and minus 175 degrees F. is used to chill the water or liquid in the mixing chamber to about plus 40 degrees F. Like the preferred embodiment, this embodiment preferably uses one of two different storage means, or both, to delay the use of energy from the time it is available to the time it is needed, including 1) the compressed air energy storage tank, which can store energy in the form of compressed air energy, and/or 2) the separation tank, which can store energy in the form of chilled water. By being able to provide the above outputs, on a time delayed basis, by using only the two inputs, and the two storage mediums described above, the preferred embodiment is able to significantly increase the overall efficiency of the system.

In another embodiment, the energy needed to produce compressed air energy can be provided by means other than wind turbines. For example, rather than having to use wind turbines, or otherwise using wind energy, which can be unpredictable and uncertain, these systems can use energy from the power grid, including geothermal and nuclear power, such as during off-peak hours, i.e., during the nighttime, in which case, the energy that is used can be drawn at a lower energy rate to drive the compressor. For example, the energy from the grid can be used to compress air into the compressed air energy storage system at night, wherein the compressed air can be stored, and then, at the appropriate time, the compressed air can be released by the turbo expander to generate electricity and/or chilled air. As discussed previously, the chilled air can be used to chill and/or desalinate water, so that the chilled water can also be stored in a separation tank, which can then be made available at a later time, in an air conditioning system. Because the energy from the grid can be stored when the rates are relatively low, and the energy can be made available later, this embodiment is able to reduce the overall cost of using the energy, by purchasing the energy when demand and rates are low, and then using the energy when demand and rates are high.

The combustion-driven power grid, the geothermal and nuclear power sources prefer to operate continuously at a steady output for their ideal performance. Unfortunately, the demand for power decreases at night. Thus the energy storage techniques described herein are particularly applicable.

In other embodiments, rather than using a compressed air energy storage system, the system can generate chilled water to be stored in the separation tank by using conventional water freezing desalination systems, which generate cold temperatures, to freeze seawater, and produce chilled purified water. This way, the cold exhaust temperatures produced as a result of using the conventional desalination system to purify water will not be wasted, but rather, can be used to chill water, which can then be stored in the separation tank, and used later, when the need for air conditioning is greater.

BRIEF DESCRIPTION OF THE DRAWINGS

FIGS. 2b and 2c are data sheets relating to the secondary compressor and the heat exchangers that are used to keep the chilled air cool.

FIGS. 2d and 2e are graphs showing different turbo expander discharges.

DETAILED DESCRIPTION OF THE INVENTION

Figure 1:
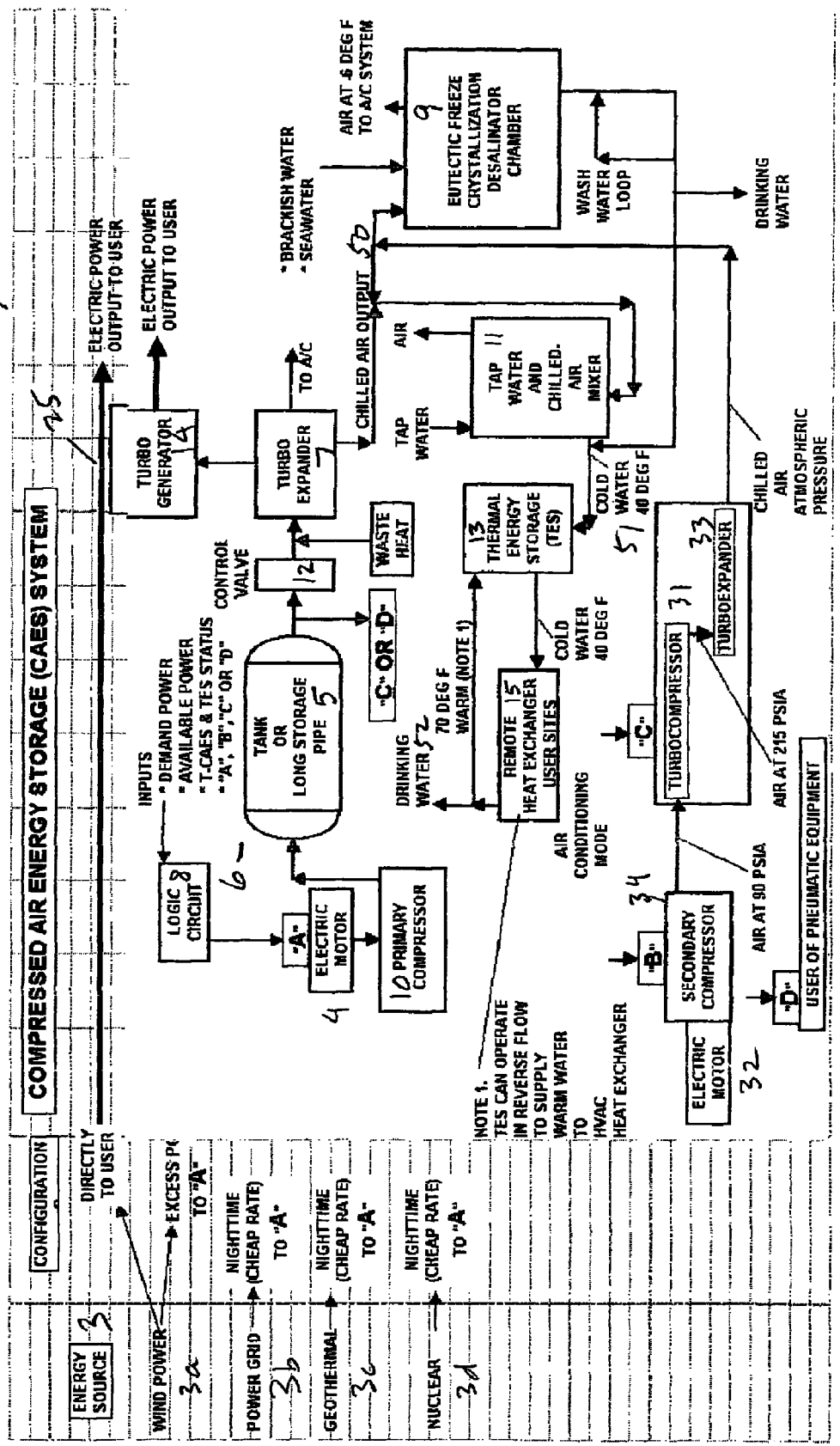
FIG. 1 is a schematic drawing showing the universal component embodiment of the present invention.

1. System Components:

FIG. 1 is a schematic diagram showing a universal embodiment that contains all components and features for all scenarios in a single system 1. Generally speaking, it contains an energy source 3, a primary compressor 10, a compressed air energy storage tank 5, a turbo expander 7 for releasing the compressed air, a turbo generator 14 for generating electricity using the compressed air, a desalination system 9 for using the chilled air generated by the turbo expander to produce chilled fresh water, a mixing chamber 11 for using the chilled air to produce chilled water, a thermal energy storage unit 13 with separation tank for storing the chilled water, and an air conditioning system 15 that uses the chilled water to produce chilled air for cooling. There can also be a secondary compressor 34, additional heat exchangers, etc.

Figure 3:
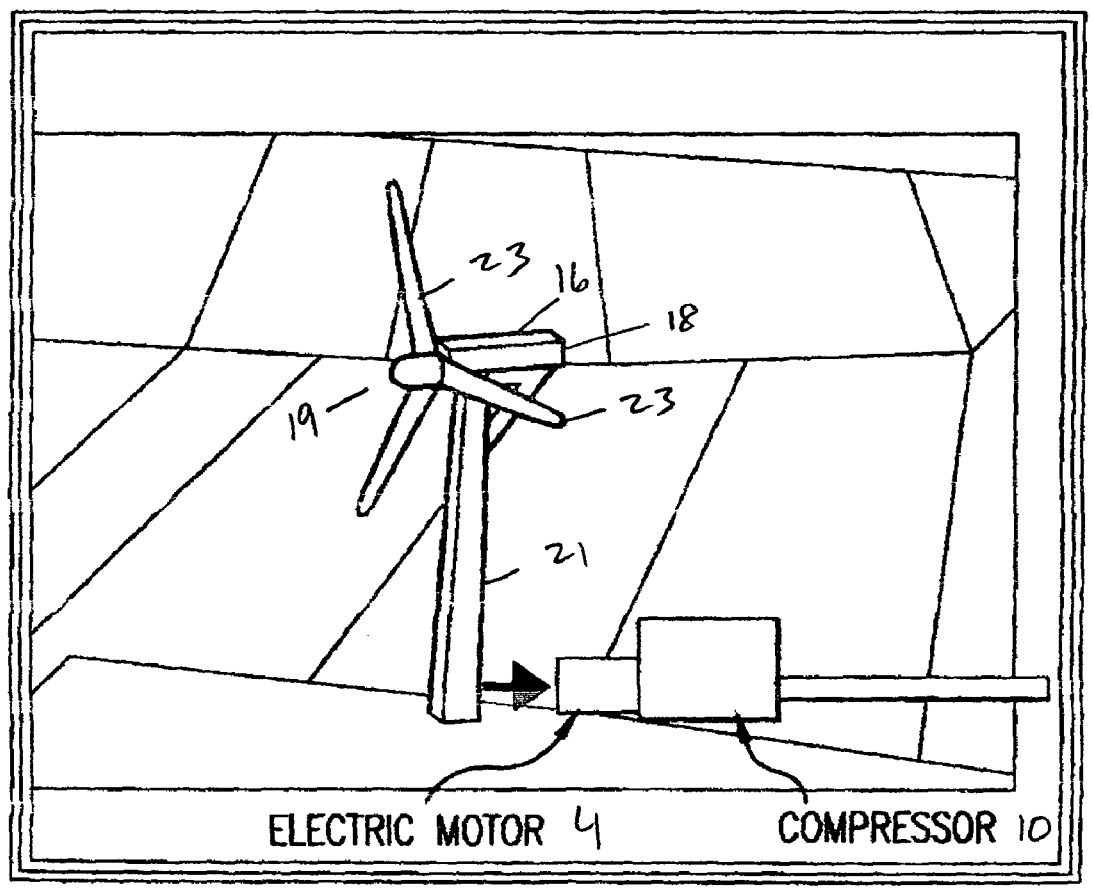
FIG. 3 shows a schematic of the wind turbine. Although the drawing shows an electric motor 4 and compressor 10 at the bottom of the tower, the present invention contemplates that there are two methods of driving the compressor: First, the electric generator can be located within the nacelle of the wind turbine, wherein the electricity from the generator can be transmitted down the tower to drive the electric motor, which in turn, drives the compressor. Second, a gear train can be provided in the nacelle, wherein the mechanical rotational energy of the wind turbine can be transmitted down the tower, and used to directly drive the compressor, without having to convert the rotational energy into electricity first. The first method is the preferred practical approach. The second method offers more efficient transmission, but involves proper structural stability considerations.

The major system components consist of the following:
Energy Source
Compressed Air Energy Storage System
Turbo Compressor and Expander With No Storage
Mixing Chamber
Desalination System
Thermal Energy Storage System
Air Conditioning System A. Energy Source:

The source of energy 3 that can be used in connection with system 1 can be any conventional means, such as standard electricity from the power grid 3b, geothermal power 3c, nuclear power 3d, etc., but in the preferred embodiments, the energy is wind power 3a generated by one or more wind turbines 19, as shown in FIG. 3.

Conventional wind turbines 19 can be used, wherein each wind turbine station preferably comprises a tower 21, with a horizontal axis wind turbine located thereon. The tower 21 is preferably erected to position the wind turbine 19 at a predetermined height, and each wind turbine is preferably "aimed" toward the wind. The wind turbine 19 can be installed at the top of the tower 21, with the blades or fans 23 positioned about a horizontally oriented rotational shaft 18. A gearbox and an electrical generator can be located inside the nacelle 16 of the wind turbine 19 such that the mechanical rotational power of the shaft 18 can directly drive the generator to produce electrical energy. By locating the electrical generator directly on the shaft 18, via a gearbox, mechanical power can be efficiently converted to electrical power. The electrical energy can then be transmitted down the tower 21, via a power line, which can be connected to other lines or cables, and distributed to system 1, to provide energy for immediate use or for storage. In FIG. 3, electric motor 4 is shown at the bottom of the tower 21, for driving compressor 10, although any configuration at the bottom of tower 21, including a connection to line 25, and/or a switch, can be provided.

Wind turbine 19 preferably converts rotational mechanical power to electrical energy using the electrical generator located inside the nacelle 16. In one aspect of the wind turbine system, the electrical energy can be used to generate electricity for immediate use by the associated facility, user or grid. In this respect, a line or cable 25, as shown in FIG. 1, is preferably connected to the wind turbine generator, so that the electrical energy from the wind turbine 19 can be used immediately when it is needed most, i.e., when demand is high, as a means of supplementing the electrical energy generated and provided by the power grid. This electricity can be used for power smoothing, which can be integrated with transmission lines and neighboring networks, as well as for peak power shaving, and/or to provide emergency power, if needed.

In another aspect, as shown in FIG. 1, the electrical energy can be used to drive electric motor 4, which can drive primary compressor 10, to produce compressed air energy, which in turn, can be stored in the compressed air storage tank 5, which is part of the compressed air energy storage system 6 ("CAES system"). The CAES system 6 can store the wind energy in the form of compressed air energy, so that, at the appropriate time, the energy can be released by turbo expander 7, and used later, when it is needed, and/or is more convenient.

Preferably, a logic circuit 8 is provided which controls how and when the wind energy from the wind turbine 19 is converted to electricity and/or compressed air, which will depend on the needs of the user, and system, and the availability of wind. For example, during the day, when the demand for electricity might be immediate, and the wind is blowing with sufficient force and regularity, the system 1 can be switched so that most or all of the wind energy is converted to electricity for immediate use, in which case, the electricity is transmitted along line 25 to the user facility, to supplement and reduce the cost of the power from the grid. On the other hand, when there is little demand for immediate electricity, such as at night, the system 1 can be switched so that most if not all of the wind energy is used to power electric motor 4, which drives primary compressor 10, which in turn, stores the wind energy as compressed air energy in storage tank 5, such that it can be used at a later time. Also, any time there is excess energy produced, beyond that which is used immediately, the excess energy can go into storage, which further increases the efficiencies of the system. Other control features and options based on the logic circuit 8 will be discussed later in connection with additional features of the system.

In one variation of the embodiment, a switch can be used in association with the logic circuit 8 to direct the electricity generated by the electrical generator in the wind turbine 19 to either immediate use or for storage, or both. For example, when energy is needed immediately, the electricity produced by the generator can be distributed to line 25, in which case, it can be used by any connected facility, user or grid. When energy is to be stored, on the other hand, the electricity can be distributed to electric motor 4, which is preferably adapted to drive primary compressor 10. In this manner, electricity can simply be diverted to the appropriate use at the appropriate time, in the appropriate ratio, or apportioned amount, between immediate use and storage. For example, half of the electricity can be apportioned for immediate use, and half to storage.

In another variation (not shown), which is more particularly described in Applicants' U.S. Pat. No. 6,927,503, issued on Aug. 9, 2005, entitled "Method and Apparatus for Using Wind Turbines to Generate and Supply Uninterrupted Power to Locations Remote from the Power Grid," which is incorporated herein by reference, a mechanical power splitting mechanism that allows the wind power to be apportioned mechanically between power for immediate use and energy for storage can be provided, depending on the needs of the system. In this variation, a first gearbox is preferably located in the nacelle 16 of the wind turbine 19, which can transfer the rotational movement of the horizontal drive shaft 18 to a vertical shaft extending down the tower 21. At the base of tower 21, there is preferably a second gearbox designed to transfer the rotational movement of the vertical shaft to another horizontal shaft located on the ground, which is then connected to the compressor, such as primary compressor 10, as well as to an electrical generator.

In connection with this variation, the mechanical power splitting mechanism preferably comprises a splitter to split the mechanical rotational power of the lower horizontal shaft, so that an appropriate amount of wind power can be transmitted to the desired downstream converter, i.e., it can be adjusted to send power to an electrical generator for immediate use, and/or a compressor for energy storage.

Downstream from the mechanical splitter, there is preferably provided, on one hand, a mechanical connection to an electrical generator, and, on the other hand, a mechanical connection to a compressor, such as compressors 10 or 34 (via route designated as "B"). It can also be connected to turbo compressor 31, via route designated as "C", or to pneumatic equipment, via route "D," as shown in FIG. 1.

When the mechanical splitter is switched fully to the electrical generator, the mechanical rotational power from the lower horizontal shaft is transmitted directly to the generator via a geared shaft. This enables the generator to efficiently and directly convert mechanical power to electrical energy, and for the electrical power to be transmitted for immediate use, such as along line 25.

On the other hand, when the mechanical splitter is switched fully to the compressor, the mechanical rotational power from the lower horizontal shaft is transmitted directly to a compressor, to enable compressed air energy to be stored in the high-pressure storage tank 5, or used for secondary purposes. This way, the mechanical rotational power from the wind turbine 19 on top of the tower 21 can be transferred down the tower, and can be converted directly to compressed air energy, via the compressor located at the base of the tower, without having to convert the mechanical energy to electricity first.

The mechanical power splitter, which is adapted to split the mechanical power between power dedicated for immediate use and for energy storage, preferably comprises multiple gears and clutches so that mechanical energy can be conveyed directly to the converters and split either completely, or so that they both operate simultaneously.

In one embodiment, the mechanical splitter comprises a large gear attached to the lower horizontal drive shaft extending from the bottom of the tower 21, in combination with additional drive gears capable of engaging and meshing with the large gear. A first clutch preferably controls the drive gears and enables them to move from a first position that engages and meshes with the large gear, and a second position that causes the drive gear not to engage and mesh with the large gear. This way, by operation of the first clutch, an appropriate number of drive gears can be made to engage and mesh with the large gear, depending on the desired distribution of mechanical power from the lower drive shaft to the two types of converters.

For example, in one embodiment, there can be one large gear and five additional drive gears, and the system can contemplate that the first clutch can be used to enable the large gear to engage and mesh with, at any one time, one, two, three, four or five of the drive gears. In this manner, the first clutch can control how many of the drive gears are to be activated and therefore be driven by the lower horizontal drive shaft, to determine the ratio of mechanical power being conveyed to the appropriate energy converting component of the system. That is, if all five drive gears are engaged with the large gear, each of the five drive gears will be capable of conveying one-fifth or 20% of the overall mechanical power to the energy converters. At the same time, if only three of the additional drive gears are engaged with the large gear, then one-third or 33.33% of the mechanical power generated by the wind turbine will be conveyed to the energy converters. If two drive gears engage the large gear, each will convey one half of the transmitted power.

The mechanical splitter of the present invention also contemplates that a second clutch be provided to enable each of the additional drive gears to be connected downstream to either the electrical generator (which generates energy for immediate use) or the air compressor (which generates compressed air energy for energy storage). By adjusting the second clutch, therefore, the mechanical power conveyed from the large gear to any one of the additional drive gears can be directed to either the electrical generator or the compressor.

This enables the amount of mechanical power supplied by the wind turbine station to be distributed and apportioned between immediate use and energy storage on an adjustable basis. That is, the amount of power distributed to each type of energy converter can be made dependent on how many additional drive gears engage the large gear, and to which energy converter each engaged drive gear is connected, e.g., those connected to the electrical generator will generate energy for immediate use, and those connected to the compressor will generate energy for storage.

Based on the above, it can be seen that by adjusting the clutches and gears of the present mechanical power splitter mechanism, the extent to which energy is dedicated for immediate use and energy storage can be adjusted and apportioned. For example, if it is desired that 40% of the mechanical power be distributed to energy for immediate use, and 60% of the mechanical power be distributed to energy for storage, the first clutch can be used to cause all five of the additional drive gears to be engaged with the large gear, while at the same time, the second clutch can be used to cause two of the five engaged drive gears (each providing 20% of the power or 40% total) to be connected to the electrical generator, and three of the five engaged drive gears (each providing 20% of the power or 60% total) to be connected to the compressor. This way, the mechanical splitter can divide and distribute the mechanical power between immediate use and energy storage at a predetermined ratio of 40/60, respectively.

In another example, using the same system, if it is desired that the mechanical power be distributed one-third to immediate use and two-thirds to energy storage, the first clutch can be used to cause only three of the additional drive gears to be engaged with the large gear, and the second clutch can be used to cause one of the engaged drive gears to be connected to the electrical generator, and the other two engaged drive gears to be connected to the compressor. This way, the mechanical power supplied by the wind turbine can be distributed at a ratio of one-third to two-thirds, i.e., between energy for immediate use and energy storage, respectively.

The present system contemplates that any number of additional drive gears can be provided to vary the extent to which the mechanical power can be split. It is contemplated, however, that having five additional drive gears would likely provide enough flexibility to enable the station to be workable in many situations. With five additional drive gears, the following ratios can be provided: 50/50, 33.33/66.66, 66.66/ 33.33, 20/80, 40/60, 60/40, 80/20, 100/0, and 0/100.

By using the clutches on the mechanical power splitter, the wind turbine station can be adjusted at different times to supply a different ratio of power between immediate use and energy storage. Depending upon the power demand and wind availability histories, it is contemplated that different ratios may be necessary to provide an adequate amount of power to the user, particularly in situations where energy demand requirements remain consistent on a continuous and uninterrupted basis, despite unreliable and unpredictable wind patterns.

Moreover, the mechanical splitter can be used to completely switch the mechanical power between immediate use and energy storage, i.e., it can be set to provide 100% energy for immediate use, or 100% energy for storage, depending on the needs of the system. This can be done by having only one of the additional drive gears engage and mesh with the large gear, using the first clutch, and having that drive gear connected to the appropriate converter, using the second clutch. This enables the present system to be designed and installed on a cost and energy efficient basis. Nevertheless, while there are advantages to the mechanical train version just described, the current universal practice is to locate a generator in the nacelle of the wind turbine to drive the electric motor of the compressor, which is acceptable for immediate application of the available commercial hardware.

B. Compressed Air Energy Storage System:

In this embodiment, system 1 preferably comprises compressed air energy storage system 6, with electric motor 4, primary compressor 10, storage tank 5, a control valve 12, turbo expander 7 and turbo generator 14 for generating electricity. In FIG. 1, "A" designates the route whereby electrical energy is transmitted from energy source 3 to electric motor 4 to produce compressed air energy for storage in CAES system 6. The motor 4 preferably drives the primary compressor 10, to compress air that is then stored in storage tank 5. However, in the mechanical splitter embodiment, there is preferably a compressor connected to the rotating shaft of wind turbine 19, so that mechanical energy can be directly converted into compressed air energy in tank 5.

The compressed air energy can preferably be stored in tank 5 for an extended period of time until the energy is needed. Then, at the appropriate time, whenever the compressed air energy is needed, the control valve 12 can be used to release the compressed air to the turbo expander 7. At this point, the waste heat generated by the primary compressor 10 can be circulated to turbo expander 7, to reduce and offset the effect of super cold temperatures on turbo expander 7, if desired.

One of the outputs produced by this system 1 is in the form of electricity, which can be generated directly by the generator on the wind turbine 19, or, by the turbo generator 14, as the compressed air is released from tank 5 by turbo expander 7, to create a high velocity air flow. Another output is in the form of chilled air, which is produced as a by-product as the compressed air from tank 5 is released by turbo expander 7. The compressed air can also be used directly, such as to power pneumatic tools, i.e., see "D" in FIG. 1, wherein compressed air can be released before reaching turbo expander 7. In any case, the CAES system 6 is preferably adapted so that one, two, or three, or more outputs, can be generated at the same time, i.e., the compressed air can be used to generate 1) electricity using turbo generator 14, 2) chilled air using turbo expander 7, or 33 (see "C" in FIG. 1), and/or 3) high velocity air flow to drive pneumatic equipment (see "D" in FIG. 1). At any given time, one, two, or three, or more outputs can be utilized, as dictated by the needs of the system.

Figure 1A:
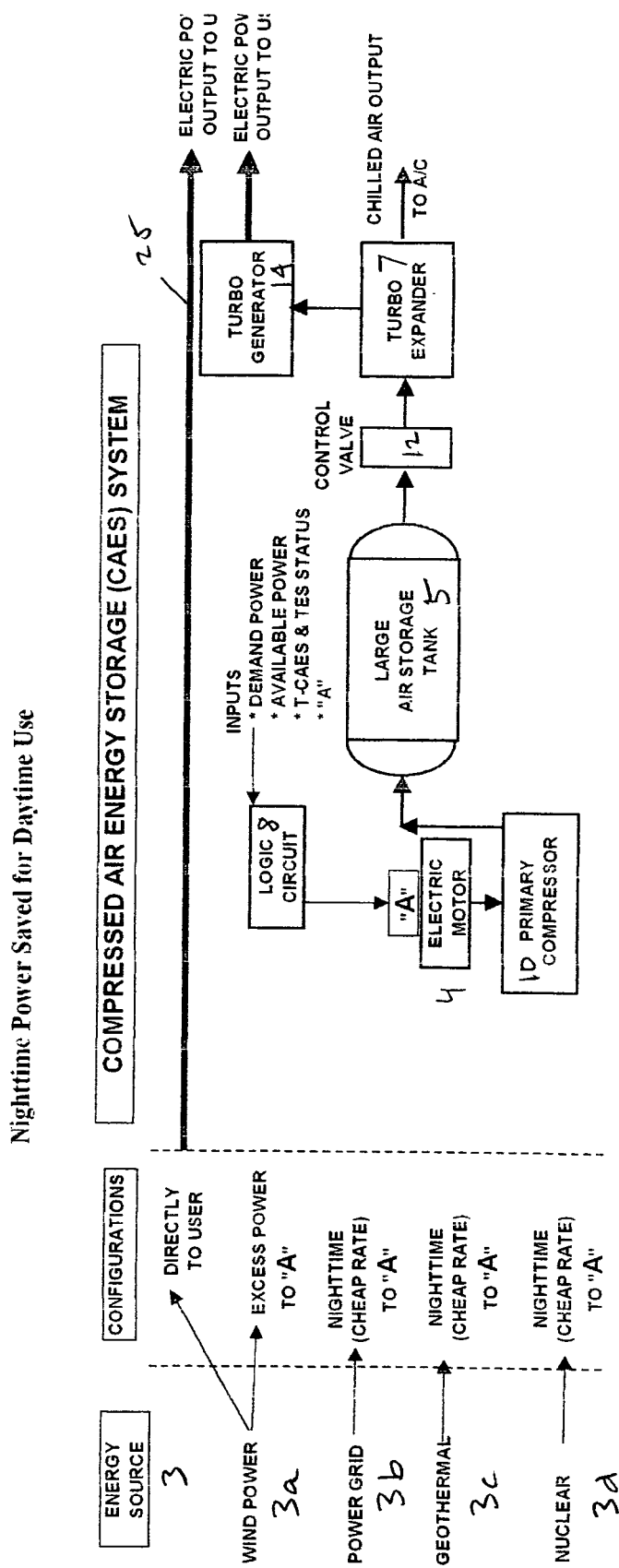
FIG. 1a is a schematic drawing showing how the universal system can be used to produce electricity for immediate use, and produce energy at night to store energy in the compressed air energy system.

The energy storage portion of the present system preferably comprises means for storing and making use of the compressed air energy as discussed above. An example of this is shown in FIG. 1a, which shows how the system 1 might operate during nighttime hours, when wind is available, but energy demand may be relatively low, wherein excess power from wind turbine 19 can be stored in tank 5. It also shows how other energy sources, including power grid 3b, geothermal power 3c, and nuclear power 3d, can be accessed to obtain power during lower cost rate periods, such as at nighttime, wherein the energy can be stored in tank 5, and used later during higher cost rate periods.

In this respect, high-pressure storage tank 5 is preferably provided and designed to withstand the pressures likely to be applied by compressor 10, and insulated to maintain a consistent temperature in the tank. Tank 5 can also be in the form of a pipeline or other container for holding pressurized air. The term tank will be used to include pipes and other compressed air storage mediums. In this respect, the pipeline discussed in Applicants' U.S. provisional application No. 60/763,577, filed Jan. 31, 2006, and 60/834,232, filed Jul. 28, 2006, as well as U.S. non-provisional application Ser. No. 11/407,733, filed Apr. 20, 2006, which are incorporated herein by reference, can be used. Tank 5 is also preferably located in proximity to compressor 10, and turbo expander 7, such that compressed air can be conveyed to tank 5, and then circulated to the turbo expander 7, without significant pressure losses. Although the present invention contemplates that various size tanks can be used, the present system preferably contemplates that the size of the tank should be based on the needs of the system, the size of the facility or demand, the costs of the system, etc., as necessary to provide a sufficient amount of energy for storage.

The present invention contemplates that any conventional means of releasing air and converting the compressed air into electrical energy can be used. In the preferred embodiment, one or more turbo expanders 7 are used to release the compressed air from storage tank 5 to create a high velocity airflow that can be used to power a turbo generator 14 to create electrical energy. This electricity can then be used to supplement the electrical energy supplied directly by the wind turbine generator, and/or by the power grid when needed, as discussed above. The turbo expander 7 preferably feeds energy to an alternator, which is connected to an AC to DC converter, followed by a DC to AC inverter and then followed by a conditioner to match impedances to the user circuits. This chain of devices assures that the variable frequency inputs result in the required constant frequency output.

Optionally, one or more means for generating and providing heat to the CAES system 6 can be provided to boost the generation of electricity by turbo generator 14. The present invention contemplates that at least three different types of heating systems can be used as a means of providing heat to the system, including 1) solar thermal collectors to utilize energy from the sun, 2) waste heat collectors to circulate the waste heat generated by the compressors, such as 10, 34, or 31, to the line preceding turbo expander 7, and 3) a separate heating unit, such as a fossil fuel burner, to introduce heat to the system. The invention also contemplates using other standard methods of providing heat to the compressed air. In this system, because it is desirable to generate chilled air when chilled air is used as a by-product for cooling purposes, the waste heat and other heating are generally used only when electricity is being generated by turbo generator 14, and, when little or no chilled air is needed or being utilized for cooling purposes.

The present invention preferably takes advantage of the cold air being generated by turbo expander 7, for additional secondary purposes, which increases the efficiency of the system. For example, in addition to using the waste chilled air for the purpose of producing chilled water, as will be discussed, the remaining cold air can be used to provide direct cooling for air conditioners, and/or rerouted through pipes to the compressor, to keep the compressors cool.

Logic circuit 8 preferably comprises a control system to control the operation of storage tank 5, compressor 10, turbo expander 7, generator 14, heating units, refrigeration components, etc. The control system is preferably designed to be able to maintain the level of compressed air energy in tank 5 at an appropriate level, by regulating the flow of compressed air into and out of storage tank 5. The controls are also used to control and operate the heat exchangers that are used to help control the temperatures of the air passing through turbo expander 33. The controls determine which heat exchangers are to be used at any given time, and how much effect they should provide. The control system preferably has a microprocessor that is pre-programmed so that the system can be run automatically.

C. Turbo Compressor and Expander With No Storage.

Figure 2:
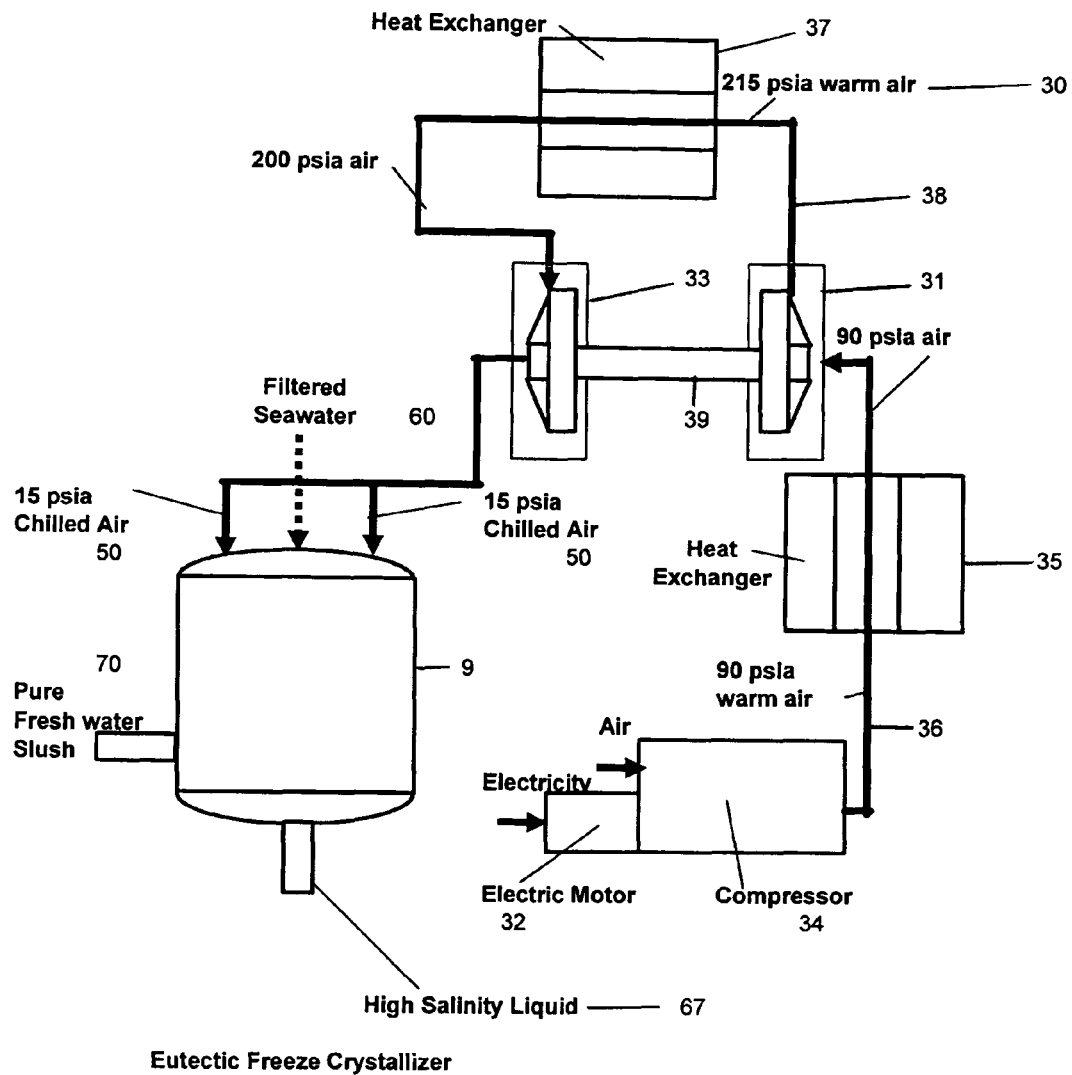
FIG. 2 is a schematic drawing showing the secondary compressor components of the universal system, along with the desalination chamber.
Figure 2A:
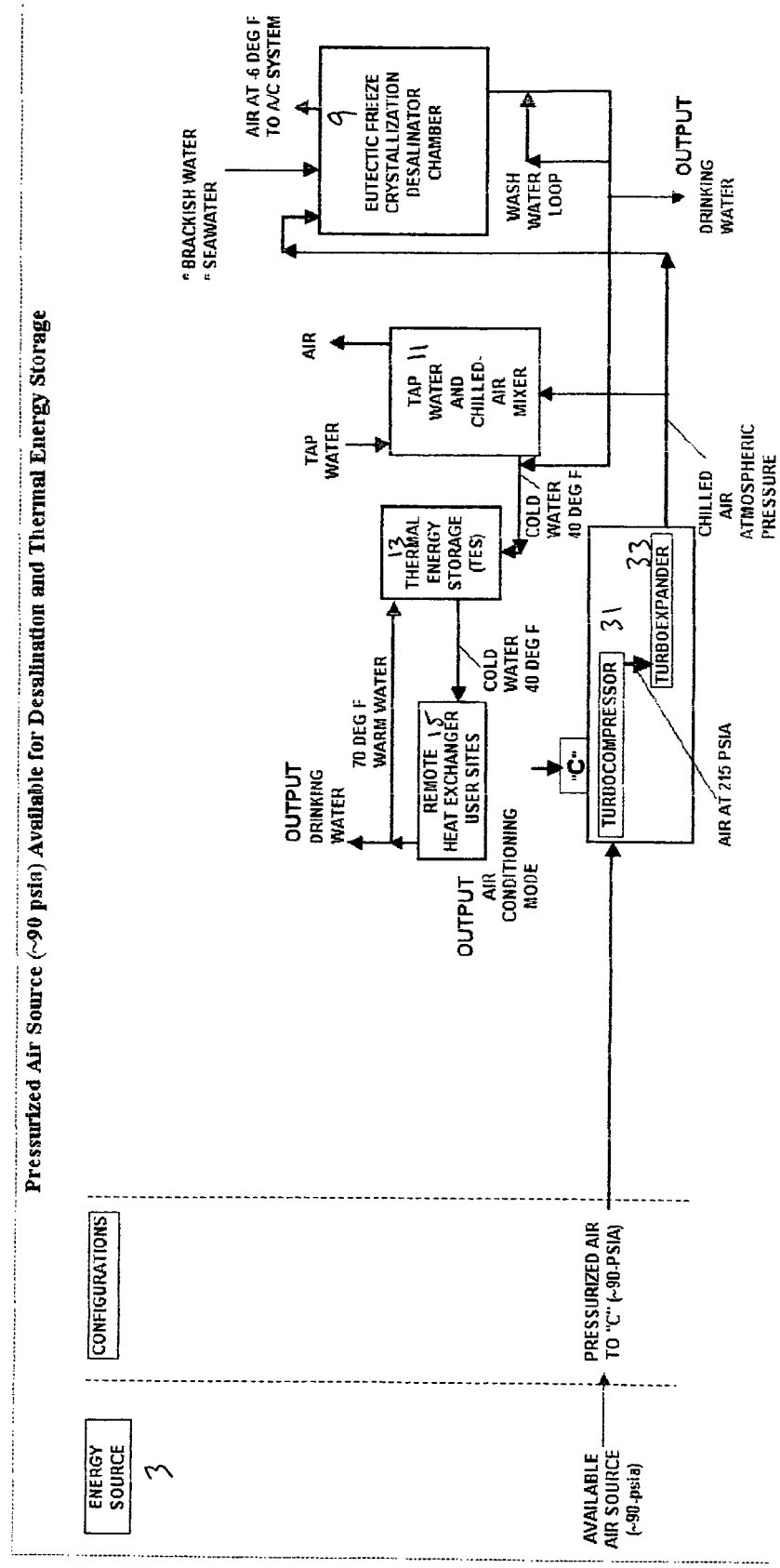
FIG. 2a is a schematic drawing showing how compressed air energy produced by the energy source can be used to produce chilled air without storing the compressed air energy first.

FIGS. 2 and 2a show details of the compressor 31 and turbo expander 33 of an embodiment 30 in which the compressed air is not stored first. This sub-system is schematically shown in FIG. 1, in connection with routes "B" and "C", wherein energy from wind turbine 19, or any other energy source 3, can be used via route "B" to compress air using electric motor 32, secondary compressor 34, and turbo compressor 31, and/or via route "C" to compress air using only turbo compressor 31, wherein the compressed air can be released using turbo expander 33, without having to store the energy first. Electric motor 32 can be driven directly by the electricity generated by energy source 3, such as when the compressed air tank 5 is full, or any other time such as when there is no compressed air being stored in tank 5 via route "A". Compressed air can also be generated by the energy source 3 and routed directly to "C" if desired, as shown in FIG. 2a. Additional compressed air energy from tank 5 can also be used via route "C", to help drive compressor 31, and turbo expander 33, as shown in FIG. 1.

As can be seen in FIG. 2, electric motor 32 is preferably provided which can be powered by any one of the energy sources 3 described above, wherein motor 32 is preferably used to drive the secondary compressor 34. Preferably, the pressurized output air from the secondary compressor 34 is cooled by a heat exchanger 35 extended along line 36, wherein the air from compressor 34 is then passed along to turbo compressor 31. The turbo compressor 31 preferably shares shaft 39 with turbo expander 33, such that driving one will also drive the other, and the system can reach a steady state operation, as will be discussed.

A second heat exchanger 37 is preferably provided along line 38 between turbo compressor 31 and turbo expander 33, such that as the compressed air travels from turbo compressor 31 to turbo expander 33, it passes through the second heat exchanger 37, to cool the air once again. This way, the air that enters into turbo expander 33 is relatively cold. A small surge tank may be provided between second heat exchanger 37 and turbo expander 33, if desired.

Because turbo compressor 31 and turbo expander 33 are driven by the same shaft 39, operating one will operate the other, which helps to reduce the overall cost of driving the mechanisms. Indeed, because the electric motor 32 is able to compress air initially, to create pressure inside the system, and the pressurized air is channeled into compressor 31, and then, to turbo expander 33, the force of driving turbo expander 33 can be used to initially drive compressor 31, thereby eliminating the need to use additional energy to drive either mechanism.

For example, when the initial pressurized-air from the secondary compressor 34 is passed from turbo compressor 31 to turbo expander 33, the turbo expander 33 starts to rotate, which in turn, causes turbo compressor 31 on the common shaft 39 to rotate as well. Then, as the turbo compressor 31 accelerates in rotational speed, it further pressurizes the input air from the secondary compressor 34 into turbo expander 33, causing the turbo expander 33 to accelerate further. The cycle of accelerating the turbo expander 33 and turbo compressor 31 systems with the same shaft 39, using the energy from secondary compressor 34, can then eventually reach a steady state, wherein the flow through secondary compressor 34, turbo compressor 31 and turbo expander 33 match. The rotational power across turbo compressor 31 and turbo expander 33 can match as well. Compressed air generated by energy source 3 can also be fed directly to turbo compressor 31, to achieve the same effect as using secondary compressor 34, as shown in FIG. 2a.

FIG. 2b shows the following: First, it shows the thermodynamic description of the secondary compressor 34 (identified as reciprocating compressor) during its operation between 14.67-psia and 90-psia. The compression process is considered isentropic so that one can take air from 14.67-psia and 70 degrees F., to 90-psia and 426.44 degrees F. (Entropy=1.6366 BTU/(#R). However, it should be noted that the compression process may be as low as 84% or less efficient, wherein the result is that more energy is expended to achieve 90-psia, so that the final temperature is actually higher, i.e., could be 492 degrees F. or higher. Water-cooling of the compressor and water-cooling in the downstream heat exchanger 35 preferably bring the output temperature to about 70 degrees F. The heated water can then be sent to the hot water system as waste heat recovery, if desired. Also consider that there may be a pressure drop, such as about a loss of 5-psi, between the secondary compressor 34 and turbo compressor 31.

A similar process is preferably repeated with the turbo compressor 31 (identified as centrifugal compressor) with its 84% efficiency. The result is that the 85-psia and 70 degrees F. air is compressed to about 205-psia and 250 degrees F., by using about 43.36 BTU/# of flowing air. Again, water-cooling of the turbo compressor 31 and water-cooling in the downstream heat exchanger 37 preferably bring the output temperature to about 70 degrees F. The heated water can then be sent to the hot water system as waste heat recovery, if desired. Also consider that there is about a 5-psi pressure drop between the turbo compressor 31 and turbo expander 33. The turbo expander 33 accepts input air at 200-psia and 70 degrees F., and exhausts chilled air at about 31.5 psia and minus 114.8 F. This releases 43.416 BTU/# of flowing air, slightly more than the 43.36 BTU/# of flowing air required by the turbo compressor 31.

A sample case is given in FIG. 2c, wherein a 2,000 hp system can provide 10,857.6 SCFM air at minus 114.78 degrees F. for chilling purposes. Note that this was achieved by powering only the 2,000 HP reciprocating secondary compressor 34 at an efficiency of 102.79 BTU/# or 5.5 SCFM/HP. In FIG. 2b there is 2,000 hp electrical input and 844.3 hp thermal output. This represents 42.2% efficiency.

These numbers and amounts are estimated, and are provided for exemplary purposes only. Actual numbers and amounts may vary.

The chill temperature available from the turbo expander is generalized by considering an example of a 200-psia input pressure and two discharge pressures (1) 30-psia and (2) 14.67-psia. In the first case, the 30-psia discharge pressure considers a downstream process wherein the chilled air will need sufficient pressurization to pass through long lengths of piping and valves and their associated pressure losses. The second case, the 14.67-psia discharge pressure considers that there is no downstream plumbing of any consequence and gives the greatest pressure drop (temperature drop) across the turbo expander.

FIG. 2d shows the strong difference between the airflow requirements to produce a unit of power (SCFM/hp) for the above two specific cases. FIG. 2d shows that the higher the input temperature, the less airflow is required to produce a unit of power. So, higher input temperatures will require smaller compressed air storage tanks to produce a given amount of power for the same power discharge time.

On the other hand, FIG. 2e shows that the lower input temperature will produce a lower discharge temperature. Furthermore, FIG. 2e shows that discharging from 200-psia to 14.67-psia (atmospheric pressure) produces extremely low temperatures for lower input temperatures. Thus if the goal is desalination, or air conditioning, it is necessary to consider the larger pressure drop and colder input temperatures.

D. Mixing Chamber:

In association with system 1, a mixing chamber 11 can be provided which uses the chilled air 50 produced by turbo expander 7 or 33 to produce chilled water 51. But unlike the desalination system 40, the mixing chamber 11 is designed to use fresh water, or any suitable liquid, in a closed loop system, so that none of the water or liquid needs to be re-distributed for other uses later.

In the case of the desalination system 40, to be discussed, one of the goals is to provide fresh drinking water to the associated facility, so after the chilled water 51 is used to provide cooling for the air conditioning system 15, that water is preferably removed from the system and re-distributed for use as fresh drinking water 52. But in the case of the mixing chamber 11, its objective is to transfer the cold temperature from the chilled air 50 to the water or liquid. Therefore, it is acceptable for the water or liquid to remain in a closed loop system. In any given system, either the desalination system 40, or the mixing chamber 11, can be provided—both are not required—although, in any given system, it may be desirable to have both, so that both features are available.

Figure 4:
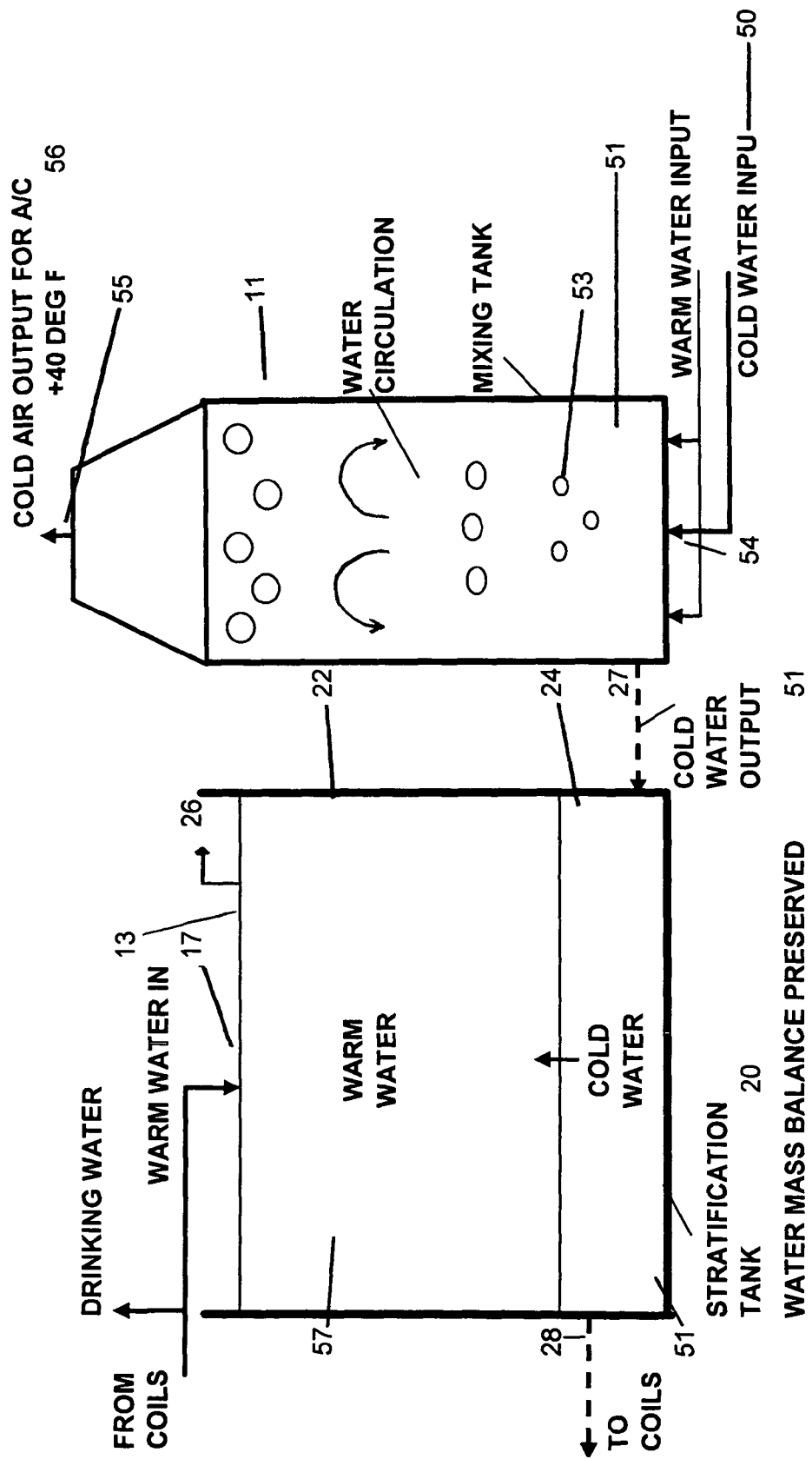
FIG. 4 shows a schematic of the mixing chamber connected to the separation tank.

In this embodiment, the mixing chamber 11 can be used to chill water 51 or any other suitable liquid. The term chilled liquid will be used in the description of mixing chamber 11 from this point on, but should be construed to include chilled water 51. The mixing chamber 11 is essentially an insulated container filled with liquid, wherein the chilled air 50 from the turbo expander 7 is preferably distributed into the mixing chamber 11, such as in the form of tiny air bubbles 53, wherein means for introducing the chilled air 50 into the mixing chamber from underneath, as shown in FIG. 4, is preferably provided. For example, this can be done by having injection nozzles or jets 54 which inject the chilled air 50 as bubbles 53 from underneath, and passing the bubbles through the liquid, so that, as the bubbles mix with the liquid, and the liquid circulates, the liquid becomes chilled on account of heat transfer. A means 55 of allowing the remaining chilled air 56 to escape from the top of the mixing chamber is preferably provided to maintain equilibrium inside, wherein the remaining chilled air 56 can be routed and used to provide further cooling for the facility. The liquid in the mixing chamber 11 can then be chilled by the chilled air 50 to the appropriate degree or temperature, depending on the needs of the system, which, in the preferred embodiment, when fresh water is used, is preferably about 40 degrees F. The chilled liquid in the mixing chamber 11 can then be distributed to the thermal energy storage system 13, as will be discussed, where it can be stored, and then used later, by the air conditioning system 15.

In this respect, the liquid in the mixing chamber 11, unlike the desalination system 40, is preferably confined to a closed loop system so that no liquid has to be added or removed. For example, if fresh water is used in the mixing chamber 11, and is cooled, it can be circulated in one direction, i.e., to the bottom 24 of the separation tank 20, as shown in FIG. 4, through lower inlet 27, wherein the chilled water 51 can be stored therein. By keeping the water in the separation tank 20 relatively still, and pumping the water very slowly, the water in tank 20 can remain stratified, with relatively chilled water 51 in the lower portion 24, and relatively warm water 57 in the upper portion 22.

Figure 5:
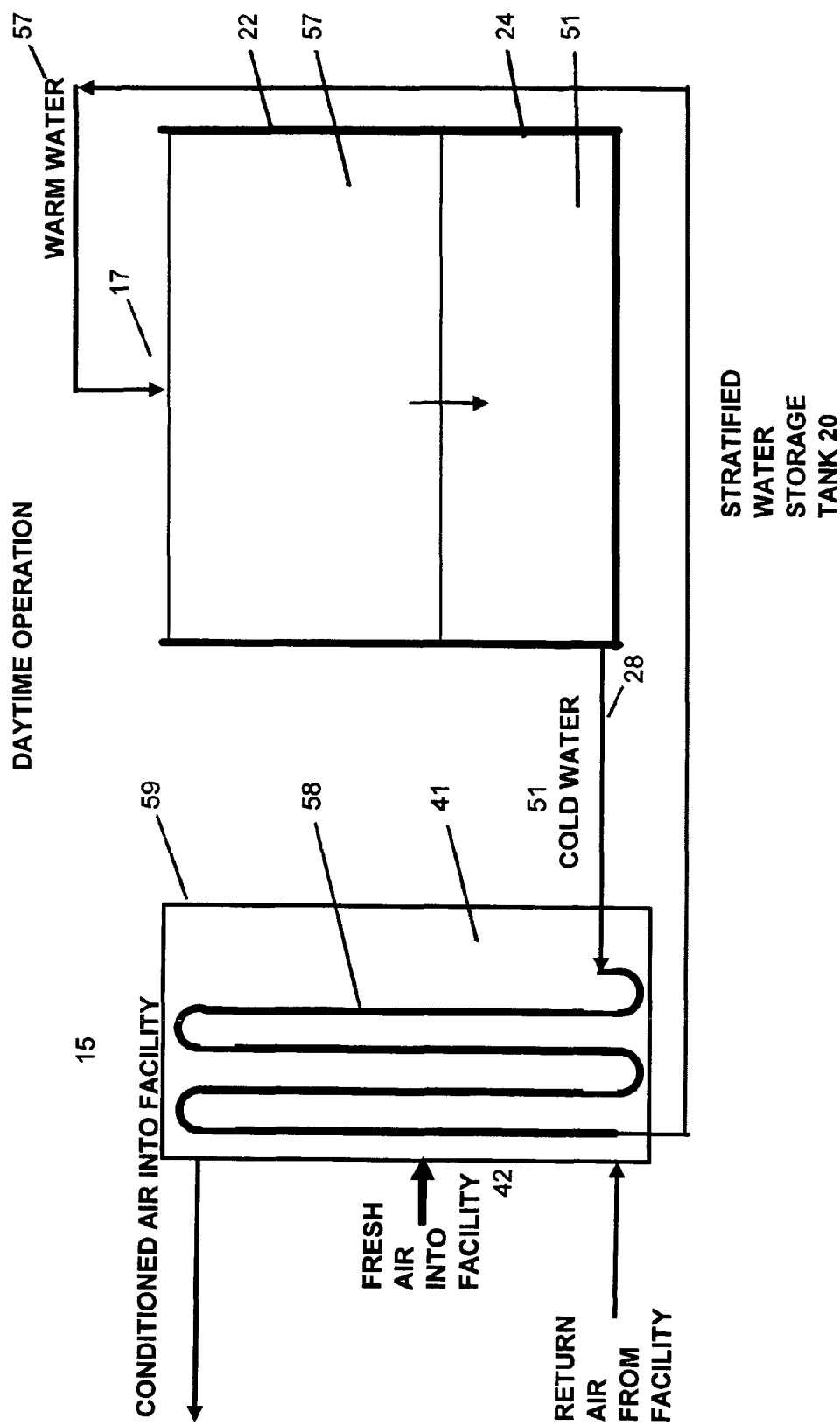
FIG. 5 shows a schematic of the separation tank connected to the air conditioning system.

The chilled water 51 in the lower portion 24 can then be distributed through lower outlet 28, and used to provide cooling for an air conditioning system 15, such as a remotely located HVAC system 59 with coils 58, as shown in FIG. 5. Then, after the cold water 51 has passed through the heat exchange coils 58 of the HVAC 59, the relatively warm water 57 can then be returned, through upper inlet 17, to the upper portion 22 of separation tank 20. Then, from there, the relatively warm water 57 can be circulated back through upper outlet 26, to mixing chamber 11, in which case, the water can then be cooled by the chilled air 50, as shown in FIG. 4. This cycle can be repeated continuously.

When fresh water is used in the mixing chamber 11, as will be discussed, the final temperature of the chilled water 51 distributed to the lower portion 24 of separation tank 20 is preferably at about plus 40 degrees F., which is optimal from a density standpoint for keeping the high and low temperatures separated in the upper and lower portions 22, 24 of separation tank 20. But when other liquids are used, or additives are added to the water, temperatures lower than plus 40 degrees F. may be possible, in which case, the cooler temperatures can be used more efficiently.

E. Desalination System:

In this system 1, one of the secondary purposes for which the chilled air from turbo expander 7 or 33 can be used is to purify water, using a desalination system 40, as shown in FIGS. 6a, 6b, 6c and 6d, and as described in the above identified U.S. provisional application No. 60/789,415, filed Apr. 5, 2006, 60/794,190, filed Apr. 21, 2006, and 60/832,777, filed Jul. 24, 2006, which are all incorporated herein by reference in their entirety.

The desalination system 40 of the present invention is preferably adapted to remove salt and other impurities from seawater or from brackish water or other impure forms of water (hereinafter collectively referred to as "seawater") 60. In this embodiment, the desalination system 40 preferably comprises a crystallization chamber 9, which can be used to remove salt and other impurities, wherein purified water can be produced thereby. The crystallization chamber 9 is preferably an insulated container specially adapted to maintain cold temperatures inside, and to allow seawater 60 and chilled air 50 to be introduced and mixed therein, as well as water and ice to form at the bottom. The crystallization chamber 9 can be similar to those disclosed in U.S. provisional application No.

60/789,415, filed Apr. 5, 2006, 60/794,190, filed Apr. 21, 2006, and 60/832,777, filed Jul. 24, 2006, which are all incorporated herein by reference.

The desalination system 40 preferably injects seawater 60 into the crystallization chamber 9, preferably in the form of a mist, or spray 62, wherein the chilled air 50 from the turbo expander 7 or 33 is preferably introduced into the chamber 9, thereby exposing the mist or spray 62 to very cold air. This causes the seawater droplets 62 to be super chilled, and flash frozen, thereby forming super cooled ice particles 63 that drop onto the bottom 64 of the chamber. The seawater droplets 62 are preferably but not necessarily introduced at the top 65 of the chamber, and the chilled air 50 is either 1) introduced in the middle of the chamber and directed upward, or 2) introduced into the chamber from above, which creates a down draft, which forces the seawater droplets 62 down to the bottom faster. The factors that determine which to use depends on how quickly the seawater needs to be frozen, which is dependent on how cold the seawater 60 is before it enters chamber 9, how cold the chilled air 50 is, the size of the chamber 9, how the seawater droplets are exposed, and the amount of each that is being introduced, etc.

The freezing of the seawater 60 preferably enables buoyant pure water ice particles 63 to be formed, with trace amounts of salty brine 67 adhering thereto, with the objective being to leave behind the salt and other impurities in the salty brine 67, at the bottom 64 of the chamber 9. The desalination system 40 preferably removes the ice particles 63 from the salty brine 67, which is denser than the ice particles 63, so that gravity can help separate the brine 67 from the ice particles 63, and cleans the ice particles 63, in one of at least two ways.

First, the ice particles 63 can form a large ice block 66, by allowing the ice particles 63 to accumulate at the bottom of the chamber 9, i.e., as they fall on top of each other. Over time, as the ice particles 63 fall, and they stick together, they will collectively form a large ice block 66, which will tend to float on top of the salty brine 67, which is more dense than ice block 66. In this respect, preferably, the system is adapted so that ice particles 63 will form a conical shape ice block 66, by introducing seawater droplets 62 into the center of the chamber 9, wherein ice particles 63 formed thereby will also accumulate in the center of the chamber. This advantageously enables the salty brine 67 that encapsulates or adheres to each pure water ice particle 63 to run down the sides, rather than being trapped inside ice block 66 i.e., in pockets or crevices that might otherwise form on block 66 as it solidifies. That is, by forming a cone shaped ice block 66, the brine 67 that adheres to each ice particle 63 will simply run off down the sides, rather than being trapped in block 66, so that salty brine 67 can be effectively separated from ice block 66 as needed. The ice that is formed is typically at about minus 6 degrees F.

Figure 6A:
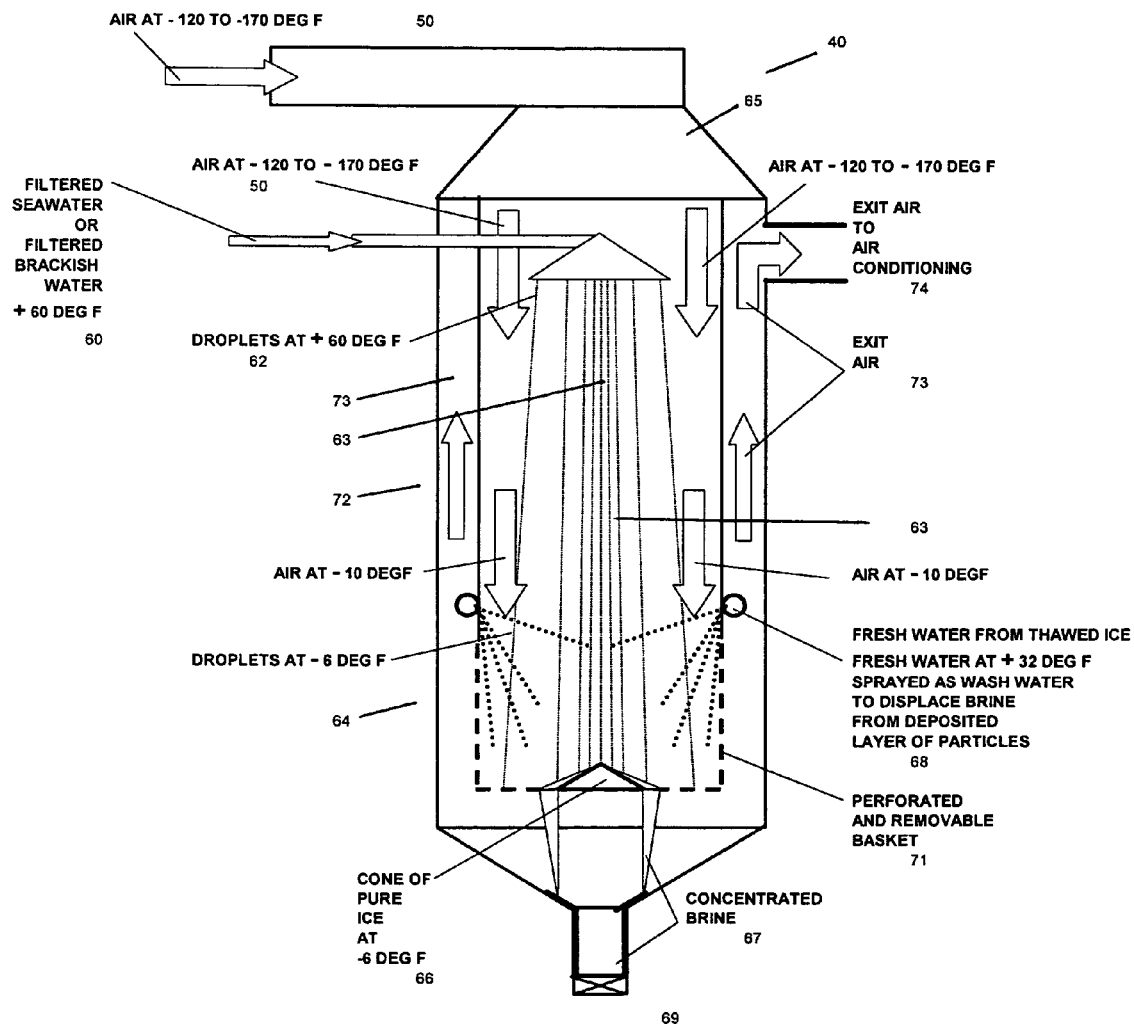
FIG. 6a shows a schematic of the desalination system with a crystallization chamber that uses chilled air to freeze particles of seawater injected into the chamber as a mist or spray.

Then, by rinsing the ice block 66 with fresh water, and allowing the block 66 to melt, fresh water can be produced. In this respect, as shown in FIG. 6a, additional fresh water at room temperature, such as at 60 degrees F., can be sprayed down from nozzles 68 onto ice block 66 to serve as a wash column, which helps to remove the salty brine 67 from the ice block 66 as the block forms. The majority of salt brine 67 is displaced from the spaces between the ice particles 63 by gravity flow. For further removal of the brine that attaches itself to the surface of each ice particle 63, there is preferably an injection of fresh water on the layer of ice/brine deposited at the base of crystallization chamber 9 to assist the gravity drainage of the salty brine 67 on a layer-by-layer basis. This fresh water freezes as it attaches to each layer and further displaces the very thin viscous salty brine layer from the interstices between the ice particles 63. The fresh water that is frozen on the ice particles is later thawed and recovered for re-use without use of additional fresh water. If even higher purity water is required, a downstream wash column can be added.

Note that water spray can be introduced to assist in enhancing the gravity drainage of the salt brine 67 as a form of pre-wash. The water freezes onto the layer of frozen ice particles 63 that are coated with brine, and, as the particles collect on the ice block 66, they displace the high viscosity brine from the surface of the ice particle 63 and allow the salt brine 67 to flow to the outer surface of block 66, as shown in FIG. 6a. The salty brine 67 is preferably drained out from the bottom of the chamber 9, through a drain 69, as shown in FIGS. 6a and 6b.

The bottom section 64 of the chamber 9 preferably comprises a perforated basket 71, which is able to catch the falling ice particles 63, to form ice block 66 thereon, but which allows the chilled air to circulate out of chamber 9. In this respect, the side walls 72 of chamber 9 preferably has channels or spaces 73 through which the excess chilled air can flow, wherein the excess chilled air preferably travels out through an exit port 74, wherein the chilled air can then be distributed to the air conditioning system 15 and used as chilled air.

Figure 6B:
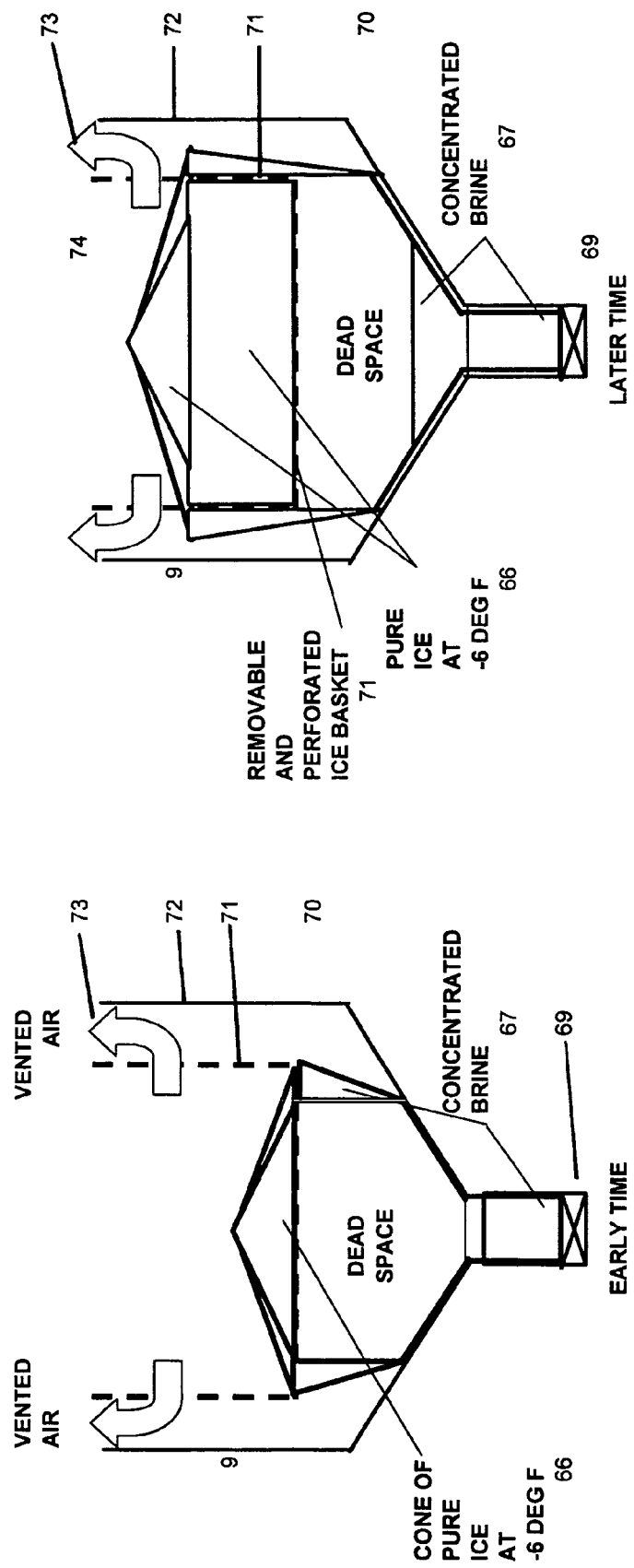
FIG. 6b is a schematic of the desalination system shown in FIG. 6a, showing how the ice particles build up at the bottom of the chamber, where a perforated basket is used to remove the ice.

The right hand side of FIG. 6b shows how the ice particles 63 form at the bottom of basket 71, to from a larger ice block 66, or, in some cases, a slurry 74, wherein the perforations in the basket allow the salty brine 67 to pass through, leaving behind the pure water ice particles 63 in basket 71. Then, by removing the basket 71, the pure water ice block 66 and/or slurry 74 can be removed from chamber 9.

Figure 6C:
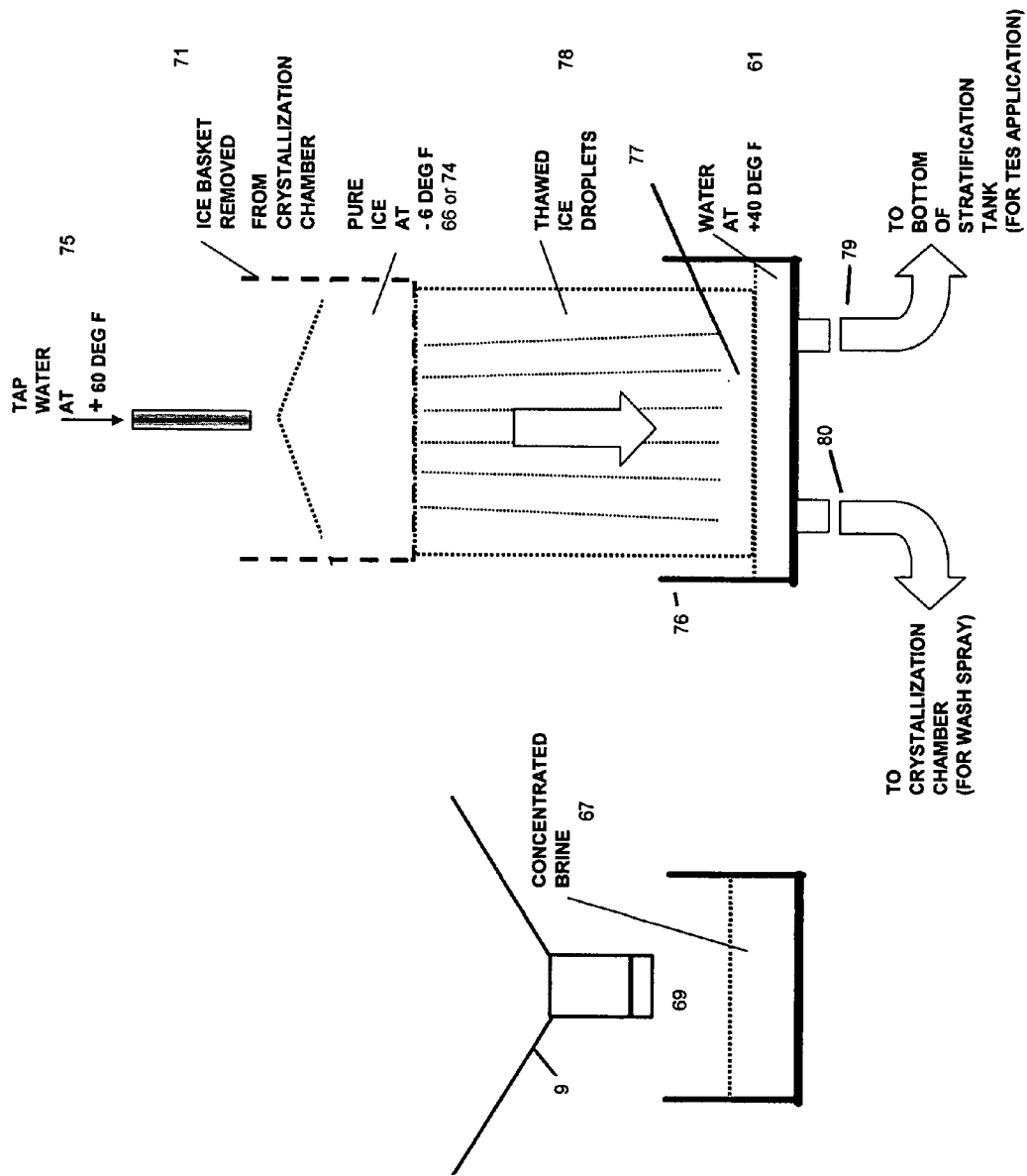
FIG. 6c is a schematic of the desalination system shown in FIG. 6a, showing how the ice particles can be removed from the chamber, and melted using a wash column in a holding tank.
Figure 6D:
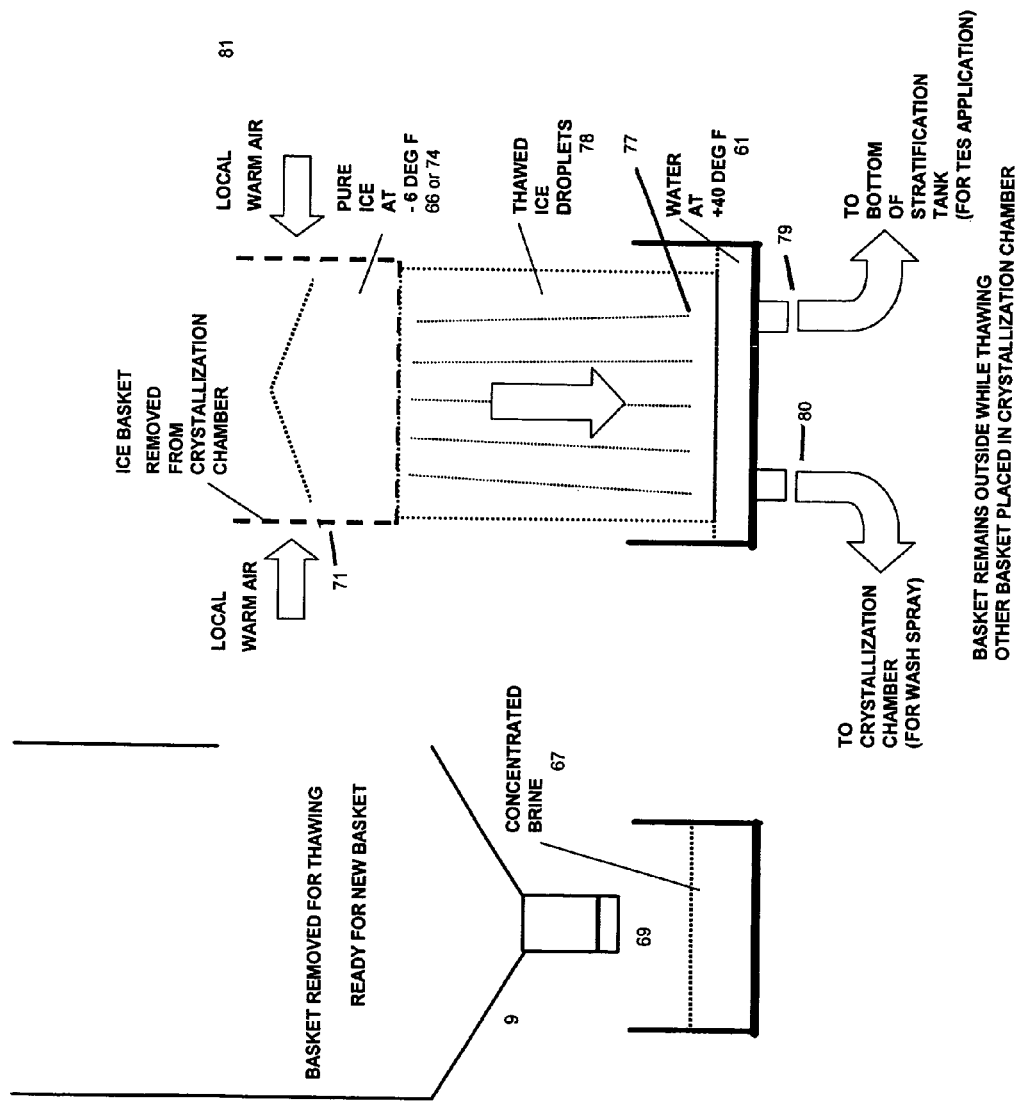
FIG. 6d is a schematic of the desalination system shown in FIG. 6a, showing how the ice particles can be removed from the chamber, and melted using local warm air, where a perforated basket is used to remove the ice.

The ice block 66 and/or slurry 74 of ice particles 63 which is removed with basket 71 can then be caused to melt, to produce fresh water at the bottom of a holding tank 76, as shown in FIG. 6c. As shown, fresh water 75 at relatively warm temperatures, in this case, at plus 60 degrees F., can be sprayed down like a wash column onto the ice particles 63, whether ice block 66 or slurry 74, to rinse the ice, and cause the ice to melt. As shown in FIG. 6d, local warm air 81 can also be brought into the holding tank 76, to further assist in melting the ice particles 63. As the ice melts, the fresh water droplets 78 pass through the perforations in basket 71, and collect at the bottom 77 of holding tank 76, in the form of chilled fresh drinking water. More than one basket 71 can be used so that the desalination and melting processes do not need to be interrupted while removing each basket 71 from chamber 9.

Because the ice block 66, and/or the slurry 74 is made of ice, and therefore, is cold, the fresh water that is produced when it melts will be chilled water. The ice is preferably at about minus 6 degrees F., and by passing water at about 60 degrees F. over the ice, the resultant fresh water is preferably at about 40 degrees F. From there, the fresh chilled water can be distributed through outlet 79 to separation tank 20, and stored there for later use by the air conditioning system 15, or, through outlet 80 to be re-circulated back to the crystallization chamber 9 to be used as the spray 68 for the wash column, or spray 75 in holding tank 76. In either case, the water can be used for secondary purposes, including providing cooling for the air conditioning system 15, or washing the ice particles 63 in the crystallization chamber 9, before the water is cycled back to be distributed as fresh drinking water 52.

In another embodiment (not shown), the system can be adapted so that the ice particles 63 will form a slurry at the bottom of the chamber 9, and a rotating screw is used to effectively and continuously remove the slurry from the chamber 9. The slurry is preferably formed when the pure water ice particles 63 fall to the bottom of the chamber 9, and the salty brine 67 which encapsulates or adheres to each one falls with it, wherein the pure water ice particles 63 end up floating in the salty brine 67 liquid, which both accumulate at the bottom. Together, the super chilled ice particles and salty brine result in a mixture with a temperature of about minus 6 degrees F, wherein the low density fresh water ice particles float within the salty brine 67 containing the undesired salts and other impurities. Most of the salty brine is removed by drainage.

To continuously remove the slurry from the chamber, and effectively separate the ice particles from the salty brine, the system can be provided with a rotating screw at the bottom of the chamber, like the one disclosed in U.S. provisional application Ser. No. 60/832,777, filed Jul. 24, 2006, which is incorporated herein by reference in its entirety. Also, any remaining salty brine coating the ice crystals can be further removed in a conventional wash column, or in a holding tank 76.

Thus the desalination system has means for separating the ice particles 63 from the salty brine 67, to make sure that any left over salt or other impurity are removed from the ice particles. For example, these ice particles 63, which are preferably cooled to about minus 6 degrees F., to assure the formation of the solid ice phase and liquid brine phase, are preferably distributed into holding tank 76, or other container, and sprayed by or otherwise mixed with additional fresh water 75, such as water that had previously been purified by the system (which can be at room temperature), and then allowed to melt. By mixing the super cooled ice particles 63 with the additional water 75 at room temperature, the system is able to produce very cold fresh drinking water, i.e., at or near freezing temperatures. For example, in connection with the thermal energy storage system 13, as will be discussed, the final temperature of the chilled water formed by the desalination system is preferably about plus 40 degrees F., which, as will be discussed, is the desired temperature for input into separation tank 20, although for other purposes, the water can be in the range of plus 32 degrees F. to plus 60 degrees F., or more, if necessary.

The chilled fresh water resulting from the desalination system 40 can then be distributed to a thermal energy storage system 13, wherein, it can be stored, and then, at the appropriate time, used to provide cooling for the air conditioning system 15, which can then be used to cool the facility, as will be discussed. Thereafter, the fresh water can be redistributed as fresh drinking water.

In one embodiment (not shown), seawater 60 is piped through tubes that wrap around the crystallization chamber 9, such that the seawater 60 is pre-cooled to near freezing temperatures even before it enters the chamber 9. That is, the super chilled air 50 that is introduced into the chamber 9 will have the effect of cooling the chamber walls 72, so that by wrapping the tubes around the walls, and running the seawater 60 through the tubes, the tubes will act as a heat exchanger, to enable the seawater to become pre-chilled. This way, the seawater, once it enters the crystallization chamber 9, will freeze more quickly, and will drop down to the bottom, where it will continue to freeze and solidify. Preferably, this way, the temperature of the seawater 60 even before it enters into the chamber 9 will be close to freezing.

Waste heat from the compressors can also be used for the opposite effect. That is, around the bottom of the crystallization chamber 9, it is desirable to prevent ice particles from sticking to, and collecting on, the chamber walls, and therefore, one way to use the waste heat is to distribute the waste heat to produce warm water, which can then be circulated through tubes extending around the lower portion of the crystallization chamber. In this respect, preferably, the warm water tubes will wrap around the lower portion of the chamber 9, which is where the ice particles are likely to accumulate, while the tubes that are used to pre-chill the seawater, will wrap around the upper portion of the chamber. These features are described in more detail in the provisional applications relating to the desalination system that have been incorporated by reference herein.

F. Thermal Energy Storage System:

The chilled fresh water resulting from the desalination system 40, and/or the chilled water or liquid resulting from the mixing chamber 11, can then be distributed to a thermal energy storage system 13, wherein it can be stored, and then, at the appropriate time, used to provide cooling for the air conditioning system 15, which can then be used to cool the facility, as will be discussed.

In this last respect, the preferred embodiment preferably comprises a separation or stratification tank 20, into which the chilled purified water from the crystallization chamber 9 or chilled water or liquid from the mixing chamber 11 can be distributed and stored. By providing a separation tank 20, as shown in FIG. 4, the coldest water 51 will remain at the bottom 24 of the tank 20, and the relatively warm water 57 will stay at the top 22 of the tank, such that the coldest water 51 can then be withdrawn from the bottom 24 and used for the air conditioning system 15. By keeping the water in the separation tank 20 relatively still, the cold and warm water will remain stratified, wherein the coldest water 51 can then be made available at the bottom, and used to provide cooling for the air conditioning system 15.

In this case, the separation tank 20 preferably has an upper portion 22, and a lower portion 24, wherein chilled water from the desalination system 40 and/or mixing chamber 11 can be introduced into the lower portion 24 of the tank 20. This way, when chilled water is needed to provide cooling for the air conditioning system 15, the chilled water can be withdrawn from the lower portion 24 of the separation tank 20, and then distributed to the air conditioner 15, which can then be used to cool the air. By keeping the water in the separation tank 20 relatively still, and keeping the flow of water into and out of the tank relatively slow, chilled water 51 will remain at the bottom 24 of the tank 20, and the relatively warm 57 water will remain at the top 22 of the tank 20. Also, from the standpoint of density, it is desirable to keep the chilled fresh water that is introduced into the bottom of the separation tank 20 at about plus 40 degrees F., which optimizes the ability of the water in the tank to remain stratified. On the other hand, in the case of the mixing chamber 11, where the water does not have to be pure, additives can be introduced into the water, or other liquids with different densities can be used, such that the temperature of the water or liquid in the separation tank 20 can be lower than plus 40 degrees F., in which case, the water or liquid that is distributed to the air conditioning system 15 can be colder, and therefore, that much more effective in providing cooling for the system.

Preferably, in the embodiment that uses the mixing chamber 11, the water or liquid that circulates in the separation tank 20 forms a closed loop, wherein the upper portion 22 of the separation tank 20 has an upper inlet 17 and an upper outlet 26, and the lower portion 24 has a lower inlet 27 and a lower outlet 28. This way, the chilled water 51 or liquid from the mixing chamber 11 can be distributed into the lower portion 24 of the separation tank 20, through the lower inlet 27, and then stored. Then, when needed, chilled water or liquid from the separation tank 20 can be withdrawn from the lower portion 24 of the separation tank 20, through the lower outlet 28, to provide cooling for the air conditioning system 15. Then, after the chilled water or liquid has passed through the air conditioning system 15, and heat has been exchanged, the relatively warm water or liquid from the air conditioning system 15 can be circulated back to the upper portion 22 of the separation tank 20, through the upper inlet 17, where the water or liquid can be stored again. Finally, at the appropriate time, the relatively warm water or liquid from the upper portion 22 of the separation tank 20 can be circulated back to the mixing chamber 11, through the upper outlet 26, so that it can be re-chilled, to start the cycle again.

When there is heating required at the site containing the heat exchanger coils, the circulation from the stratified separation tank 20 can be reversed so that warm water or liquid from the top of the stratified storage tank is transferred to the heat exchanger coils to heat the coils and the HVAC air. The cold air passing over the heat exchanger coils will then chill the water or liquid that is returned to the bottom of the stratified separation tank. When the cold water and hot water interface arrives at the top of the stratified separation tank 20, the process is interrupted.

When cold water or liquid from the mixing chamber 11 is added to the bottom of the stratified separation tank 20, the same quantity of warm water or liquid must be drawn from the top of the stratified separation tank 20 to accommodate the fixed volume of the stratified separation tank 20.

In connection with the desalination system 40, because the system preferably uses fresh chilled drinking water as the chilling medium, the water is preferably distributed back, from the air conditioning system 15, to be distributed as fresh drinking water, for use at the facility, or for any other purpose. Therefore, rather than having a closed loop system, the chilled fresh water is preferably removed from the system, after it is used to provide cooling for the air conditioning system 15, and then distributed elsewhere. The fresh drinking water can then be stored in a different tank for use as drinking water, and/or rerouted to the desalination system 40 for use as the melting water for the additional ice particles formed. Additional seawater is then brought in for purposes of producing additional chilled water. The system is preferably set so that an optimum and consistent amount of water remains in the separation tank at any given time, despite the fresh water being removed from the system, and new seawater being added. When both mixing chamber 11 and crystallization chamber 9 are used in the same system, it is desirable for fresh water to be used in both circulating systems, and for the chilling medium in mixing chamber 11 to not be a closed loop system.

G. Air Conditioning System:

The air conditioning system 15 preferably has heat exchange tubes and/or coils 58 through which the chilled water 51 from the separation tank 20 can be piped. This way, the chilled water 51 passes through the inside of the tubes and/or coils 58, which are located in the central air conditioning chamber 41, such that air 42 circulating within the chamber 41 can be cooled via heat exchange. That is, as the air 42 is passed through, and over the chilled tubes and/or coils 58, the relatively warm air 42 surrounding the relatively cool tubes and/or coils 58 will become chilled, and can then be distributed throughout the facility, such as through a ventilation system, to provide cooling air to the facility. The chilled air 50 from the turbo expander 7, which exits from the turbo expander 7, or remaining chilled air 73 from the crystallization chamber 9, or resultant chilled air 56 from mixing chamber 11, can also be used to provide cool air for the air conditioning system 15 or for the facility. The chilled water can also be distributed to other neighboring facilities, in the form of chilled water, such as through a network of insulated pipes, wherein the system can be expanded, to provide additional cooling capabilities, for additional facilities nearby. When the system uses fresh water from the desalination system 40 as the chilling medium, the water is preferably distributed back, from the air conditioning system 15, to be distributed as fresh drinking water, for use at the facility, or for any other purpose.

H. Other Components:

In addition, a secondary compressor 34 can be provided, wherein any excess electricity from any of the energy sources, and/or any excess compressed air energy not used by the system, or other device in the system, can be used to power the secondary compressor 34, and/or turbo compressor. The secondary compressor 34, turbo compressor 31 and turbo expander 33, as shown and described above in connection with FIG. 2, preferably convert the energy to chilled air, which can be routed to the chilled air output, which can be distributed into either the desalination system 40, or the mixing chamber 11, or both.

2. Operation:

The universal component embodiment shown in FIG. 1 is preferably capable of being operated in a number of different modes:

Maximum Electricity Output

Generation of Electrical Power and Co-Generation of Chilled Air for Immediate Air Conditioning Generation of Electrical Power and Co-Generation of Chilled Air for Immediate Air Conditioning and Thermal Energy Storage (Delayed Air Conditioning)

Generation of Electrical Power and Co-Generation of Chilled Air for Desalination, Immediate Air Conditioning and Thermal Energy Storage (Delayed Air Conditioning)

Figure 7:
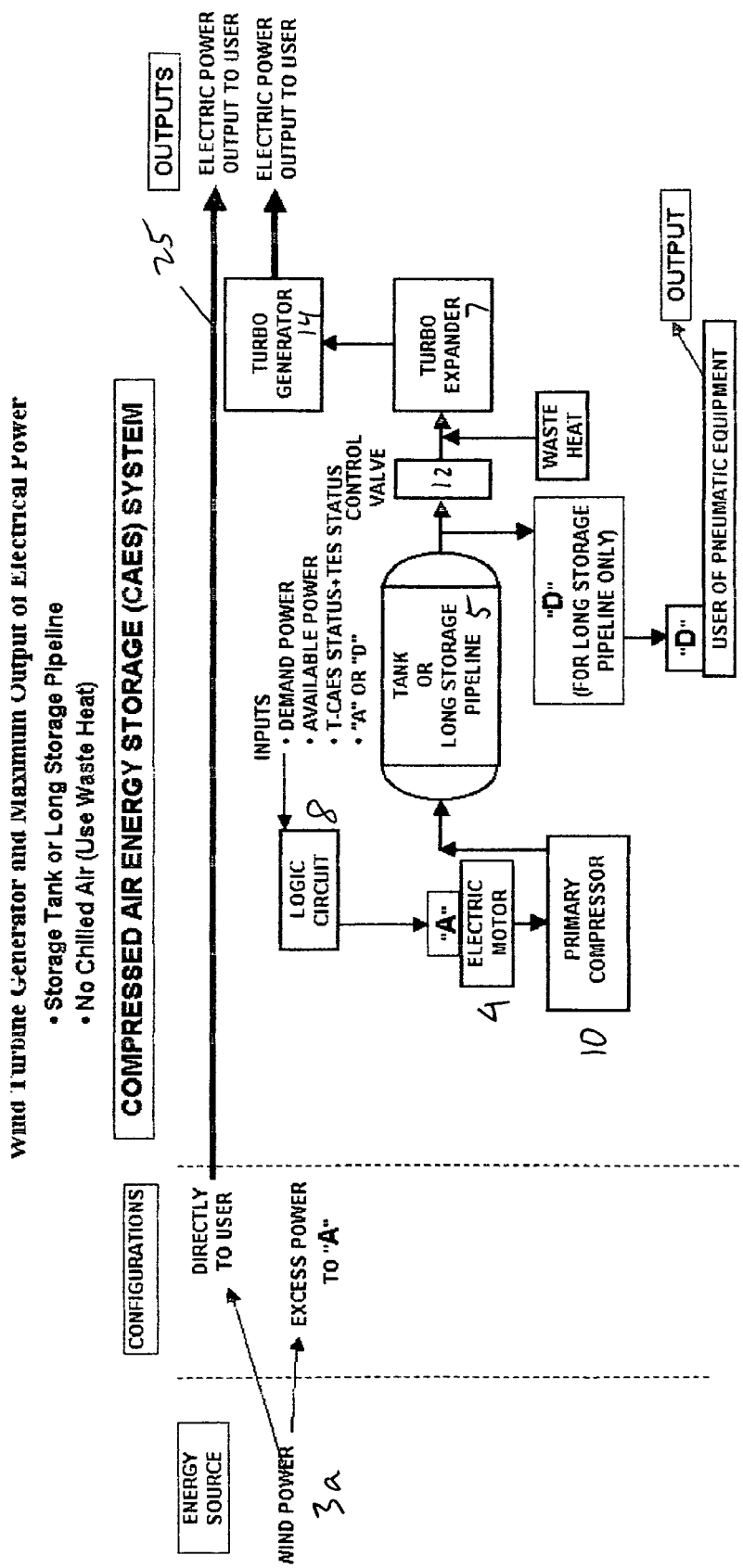
FIG. 7 is a schematic drawing showing the universal component embodiment of FIG. 1, wherein wind power is used to generate maximum electrical power.

Generation of Electrical Power and Co-Generation of Chilled Air for Immediate Air Conditioning and Thermal Energy Storage (Delayed Air Conditioning) When Compressed Air Storage Tank is Full Generation of Electrical Power and Co-Generation of Chilled Air for Desalination, Immediate Air Conditioning and Thermal Energy Storage (Delayed Air Conditioning) when Compressed Air Storage Tank is Full A. Maximum Electricity Output:

In one mode of operation, as shown in FIG. 7, the system parameters can be set so that the maximum amount of electricity is generated for immediate use. This can be advantageous, for example, during daytime hours, such as when there is a high demand for electricity for use by the facility, and there is a relatively consistent supply of wind available.

In this mode, most, if not all, of the direct wind power is used to generate electricity that can be transmitted along line 25 to provide power to the facility, grid, or other user, on an on-demand basis. This can be accomplished, for example, by using the appropriate setting on the logic circuit 8, which controls the distribution of energy from source 3. At this setting, as much of the wind energy that is needed is transmitted along line 25 in the form of electricity, and only excess wind energy, over the demand, is transmitted into storage. In such case, the energy generated by the wind turbine can be transmitted to "A," which serves to power the electric motor 4, which drives primary compressor 10, which in turn, compresses air and stores it in tank 5 for later use. The stored compressed air which is stored in a pipeline can also be used to drive pneumatic equipment, via route "D" shown in FIG. 7.

For maximum output of electricity, the stored compressed air in tank 5 can also be used to power the turbo generator 14, such that the stored wind energy can also be dedicated to producing electricity as well. This way, even if the availability of wind is irregular, or weak, during that time, the compressed air from storage can be used to supplement the direct energy supplied for immediate use. This enables the flow of electricity to the facility or user to be relatively continuous, and uninterrupted, and free from surges and spikes, even if wind speed levels fluctuate. In this respect, the invention is intended to contemplate providing constant power output levels for relatively long durations, as taught in Applicants' U.S. Pat. No. 6,963,802, issued on Nov. 8, 2005, entitled "A Method of Coordinating and Stabilizing the Delivery of Wind Generated Energy," which is incorporated herein by reference in its entirety.

Moreover, any waste heat generated by the compressor can be re-distributed into the compressed air energy storage system, to increase the pressure and efficiencies of the system, which further helps to produce the maximum amount of electricity output. When a titanium turbo expander 7 is used, the waste heat should not exceed 300 degrees F. Peak shaving using daytime wind power generally requires the compressor power to be equal to or greater than that of the turbo expander 7. In this mode, using the waste heat will cause any exhaust air generated by the turbo expander 7 to be warmer, and therefore, would not necessarily be suitable for use as chilled air for secondary purposes.

Figure 8:
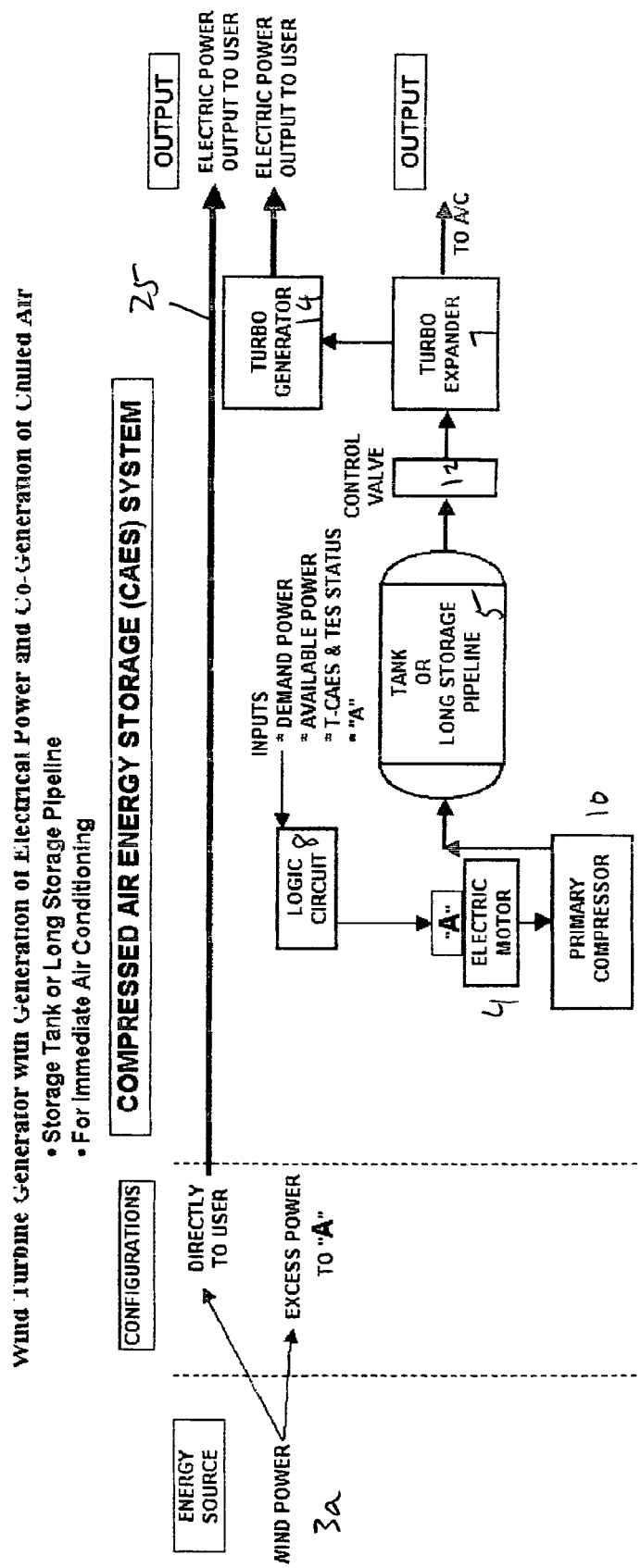
FIG. 8 is a schematic drawing showing the universal component embodiment of FIG. 1, wherein wind power is used to generate electrical power and co-generation of chilled air for immediate cooling.

B. Generation of Electrical Power and Co-Generation of Chilled Air for Immediate Air Conditioning:

In this mode, shown in FIG. 8, it may be possible to obtain the maximum electricity output, or nearly so, and, at the same time, generate chilled air for immediate air conditioning. For example, this mode can have some of the same parameter settings as the maximum electricity output mode, but as the stored compressed air in tank 5 is being released, the chilled air generated by the turbo expander 7 can be used for purposes of providing direct cold air for air conditioning. The chilled air being generated can, if desired, be delivered directly to the air mixing compartment of an associated HVAC system where it can be combined with the fresh air input and the return air input. The chilled air being produced can also be directed to the air conditioning system 15, such that the cool air can be distributed to the facility or other user. Note that each time span that electrical power is generated in terms of kW (electrical) there is the same magnitude of chilled air power co-generated in terms of kW (thermal).

In this mode, however, it may be necessary to use more of the direct wind energy for purposes of storing compressed air into tank 5, since for turbo expander 7 to operate properly there must be sufficient air pressure inside tank 5. What this means is that the logic circuit 8 may need to be adapted to sense the overall pressure in tank 5, such that when the pressure inside tank 5 drops below a predetermined minimum, the system can change the ratio of the amount of wind energy that is being devoted to immediate use, on one hand, and for storage, on the other hand, such that the amount of wind energy dedicated to storage can be increased, which in turn, will help replenish compressed air energy in tank 5. This will have the effect of maintaining an adequate supply of compressed air energy in storage, which means that there will be an adequate supply of chilled air for air conditioning purposes as well. In this mode, it would not be appropriate to run the waste heat from the compressor 10 to turbo expander 7.

Figure 9:
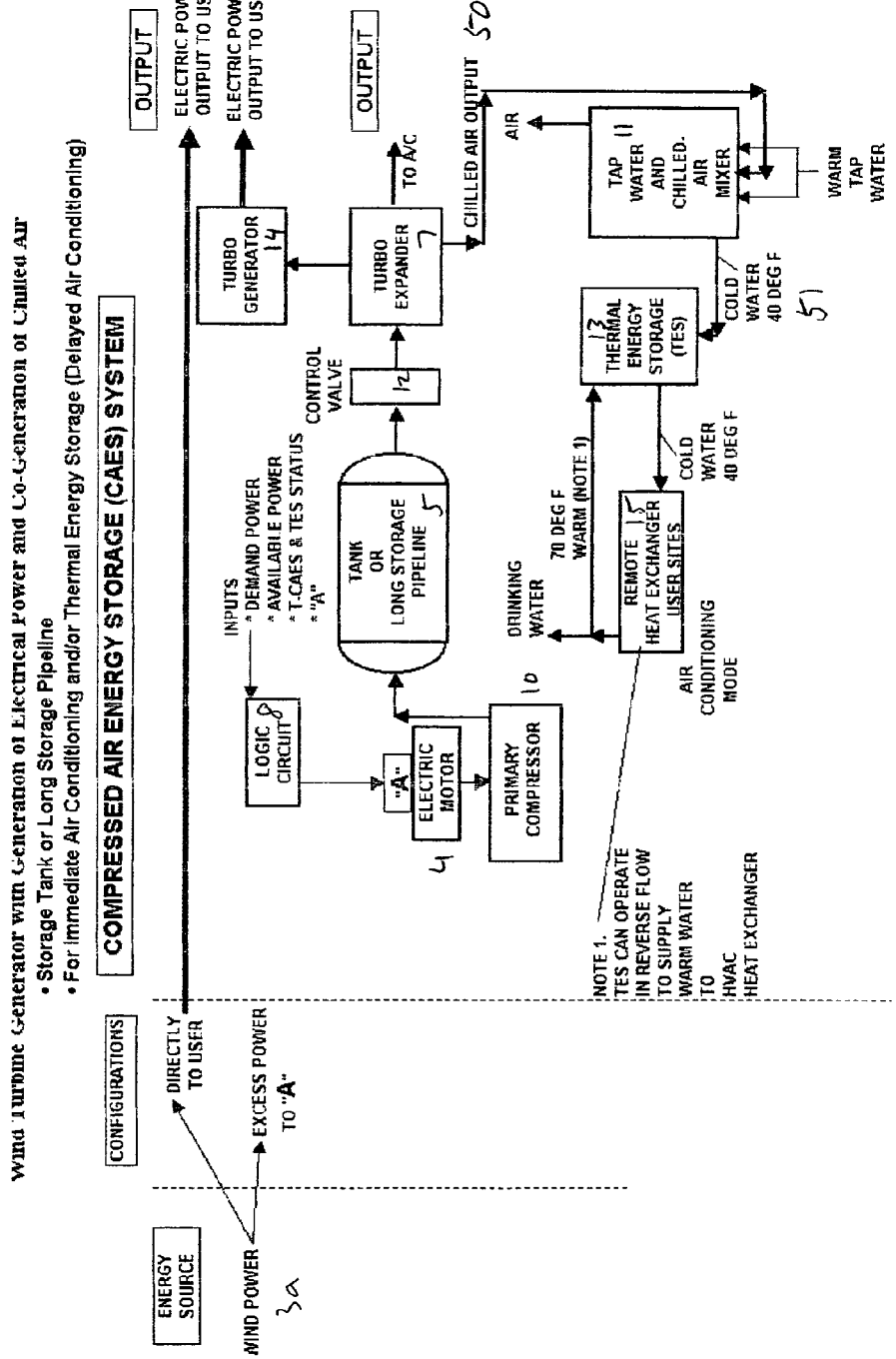
FIG. 9 is a schematic drawing showing the universal component embodiment of FIG. 1, wherein wind power is used to generate electrical power and co-generation of chilled air for immediate cooling and for delayed cooling.

C. Generation of Electrical Power and Co-Generation of Chilled Air for Immediate Air Conditioning and Thermal Energy Storage (Delayed Air Conditioning):

This mode is shown in FIG. 9, and represents a mode that is further along the spectrum on the immediate use verses energy storage ratio. As in the first two modes, this mode may, in certain cases, be used to provide maximum electricity output, but mostly only if the supply of wind energy is significantly greater than the demand for electricity, and enough excess wind energy is available to provide chilled air for both immediate and delayed air conditioning. For example, this might occur during the morning hours, when the wind is blowing, but the demand for electricity and immediate air conditioning is minimal. But when the amount of wind energy available is not as great, or, when the need for air conditioning is relatively high, the system will likely have to be set to dedicate more of the wind energy for storage as compressed air energy, and producing chilled air for cooling purposes, and less of the wind energy for producing electricity for immediate use.

At the same time, this system can co-generate electricity and chilled air at the same time, by using the compressed air energy in storage, so that by storing the compressed air in tank 5, some of that energy can still be used to generate electricity for immediate use using turbo generator 14, and is not exclusively for cooling purposes. Therefore, the appropriate ratio between using wind power for producing electricity for immediate use and storing wind power to produce compressed air energy will have to take into account the co-generative nature and characteristics of the system.

In this mode, using the logic circuit 8, the parameters can be set so that the amount of wind energy that is being dedicated to fulfilling the air conditioning needs of the facility is sufficient to keep the facility cool, taking into account the relative demands for non-cooling and cooling needs, the outdoor temperatures, etc., including the electricity needs of the facility As seen in FIG. 9, the primary objective of this mode is to use the chilled air produced by the turbo expander 7, to provide either direct cooling for immediate air conditioning by the associated HVAC, or cooling to produce chilled water, which in turn can be stored as chilled water for use for air conditioning later, or both.

When chilled water is stored, the system preferably distributes a sufficient amount of chilled air to the mixing chamber 11, wherein the chilled air is used to chill water therein, wherein the chilled water can then be stored in separation tank 20, so that it can be used later by the air conditioning system 15. As discussed, the temperature of the water stored in separation tank 20 is preferably about 40 degrees F., when fresh water is used as the chilling medium in the mixing chamber, but can be lower if additives or other liquids with different densities are used.

Figure 10:
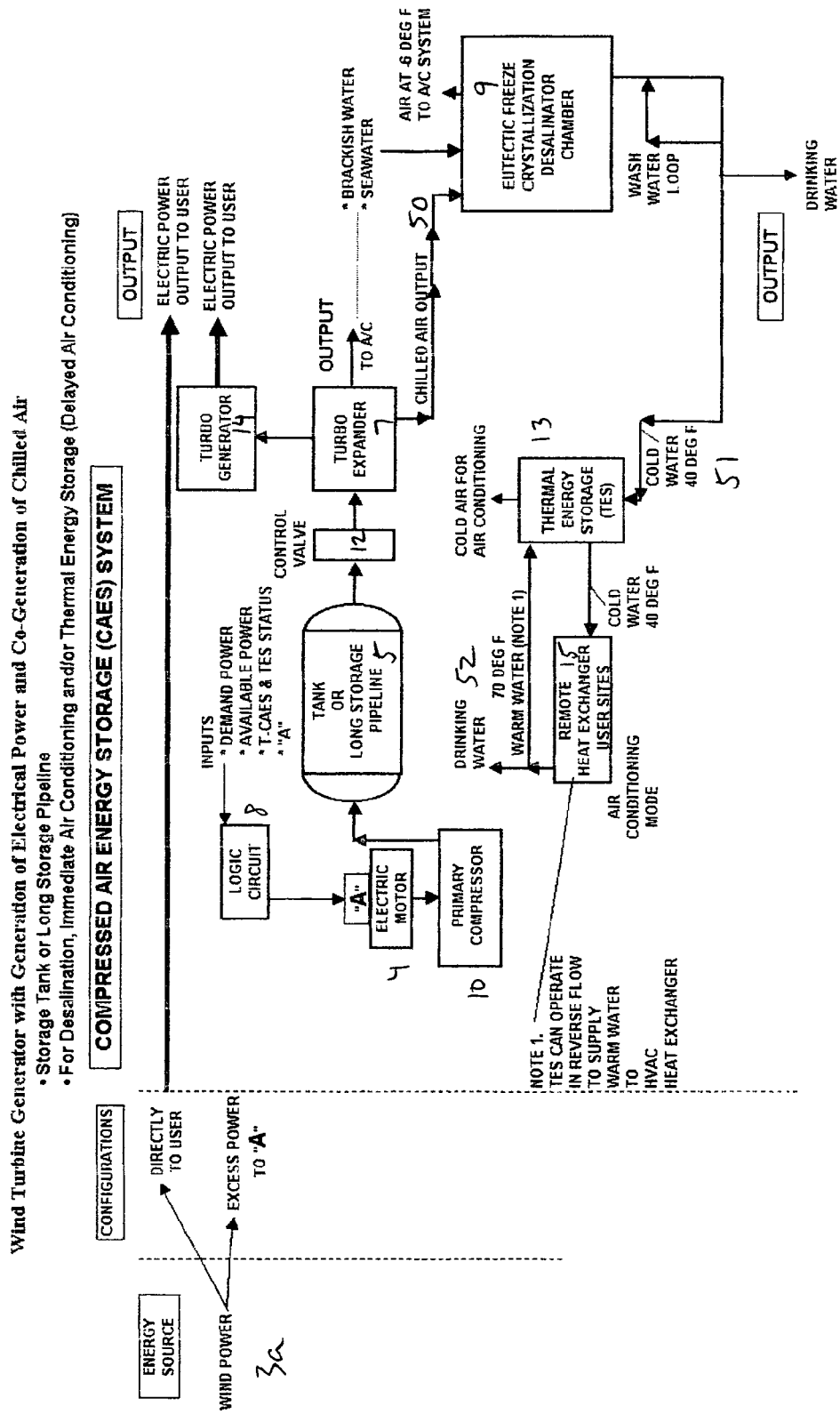
FIG. 10 is a schematic drawing showing the universal component embodiment of FIG. 1, wherein wind power is used to generate electrical power and co-generation of chilled air for desalination, immediate cooling and delayed cooling.

D. Generation of Electrical Power and Co-Generation of Chilled Air for Desalination, Immediate Air Conditioning and Thermal Energy Storage (Delayed Air Conditioning):

This mode is shown in FIG. 10, and is, in some respects, similar to the previous mode of FIG. 9, except that at least a portion, if not all, of the chilled air is used for desalination purposes, to produce fresh drinking water from seawater, in addition to providing chilled water to provide cooling for the air conditioning system.

As can be seen, in this mode, the chilled air 50 is distributed to the desalination crystallization chamber 9, which is used to freeze the seawater 60, which in turn, allows the pure fresh water to be separated from the salt and other impurities in the seawater. At the same time, because freezing temperatures are used, the resulting fresh water is substantially chilled, so that it can then be distributed into the thermal energy system 13, and stored as chilled water in separation tank 20, in much the same way that chilled water from the mixing chamber 11 is distributed into the thermal energy system 13 and stored in the previous mode. This way, the chilled water 51 in separation tank 20 can similarly be stored and used to provide cooling for the air conditioning system 15, on a time delayed basis. The chilled air being released from the crystallization chamber 9 can also be used to provide immediate cooling for the air conditioning system, and releasing the compressed air can be used to co-generate electricity using turbo generator 14, to increase the efficiencies of the system.

In this mode, the settings are preferably made so that the fresh water that circulates to the thermal energy system 13, and then to the air conditioning system 15, re-circulates back, so that it can be withdrawn, and used as fresh drinking water 52, such as for the facility or any other user. Some of the fresh water that has been warmed by the air conditioner 15 can also be re-circulated back to be used as the melting water for the ice particles that are formed by the desalination system 40.

The chilled air is sent to the crystallization chamber 9 for interaction with the seawater (or brackish water) spray to form solid ice (fresh water) and liquid salt brine. The brine coating around the solid ice may be removed by gravity (settling), or, for greater purity of the water separation from the brine, the ice may be washed with clean water where the cleaning water is also recovered as clean water.

The chilled ice at temperatures close to "minus 5 degrees F." can be combined with tap water at "plus 60 degrees F." to form water at "plus 40 degrees F." and sent to the separation tank 20 of the thermal energy storage system 13. Since water is being added to the thermal energy storage system 13, the same quantity of water is preferably removed as drinking water.

In the mode where the thermal energy storage system 13 is used for chilling a coil 58 on an air conditioning system 15, such as at a remote location, the cold water 51 is preferably fed to the bottom 24 of the separation tank 20, while the warm water 57 layer moves to the top 22 of the tank 20 and is removed as drinking water. The chilled water 51 from the bottom of the separation tank 20 is preferably pumped to the air conditioning system 15 where warm air is blown over the coils 58. The result is warmed water and chilled air. The warmed water is returned to the top of the separation tank 20, and chilled air is circulated by the air conditioning system 15 to the facility or user.

In the mode where the thermal energy storage system 13 is used for heating the remote coils 58, the water circulation is reversed. Relatively warm water is drawn from the top 22 of the separation tank 20 and returned as colder water to the bottom 24 of the tank. There is preferably no water added or removed during this reverse circulation cycle.

Figure 11:
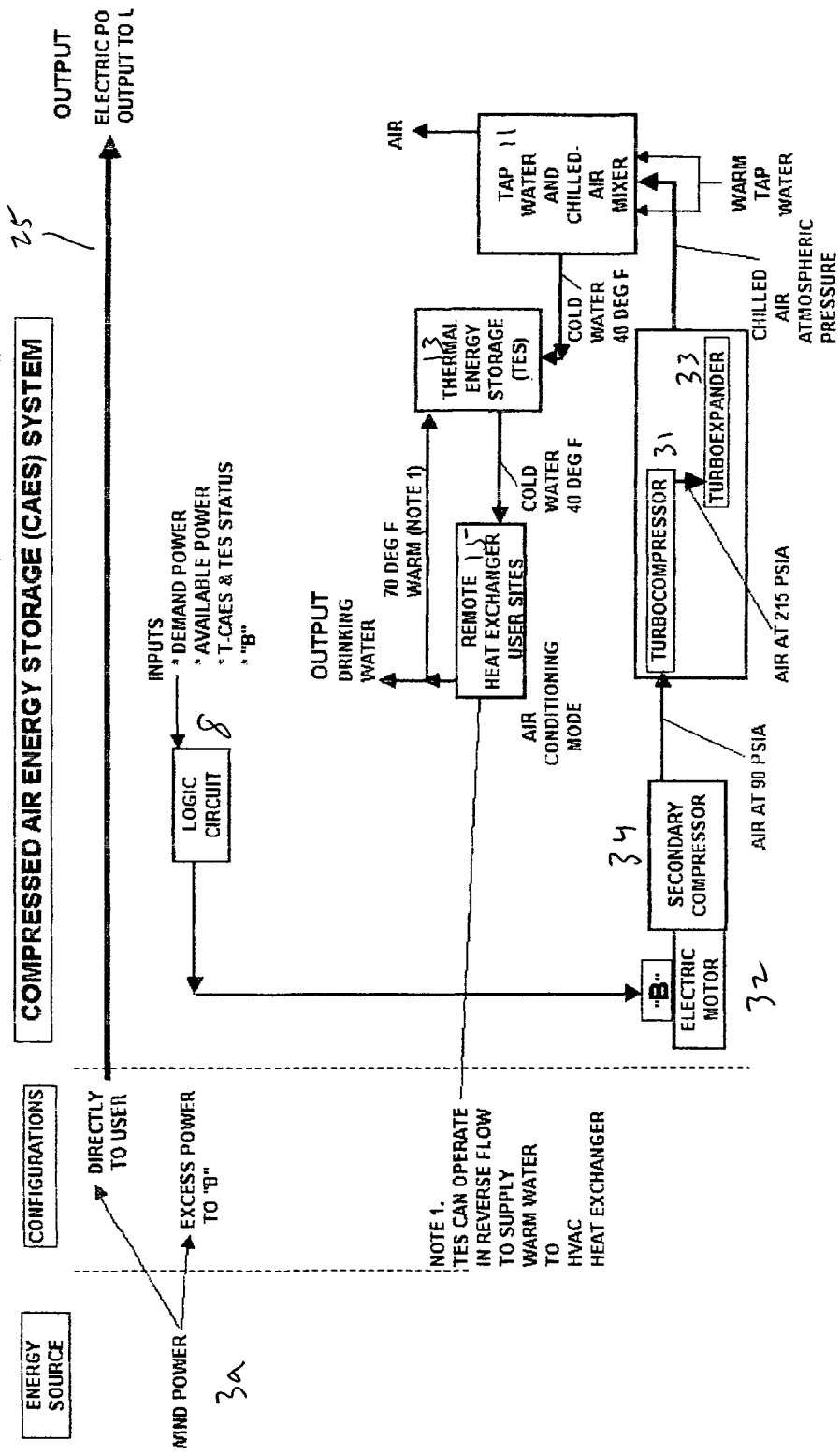
FIG. 11 is a schematic drawing showing the universal component embodiment of FIG. 1, wherein wind power is used to generate electrical power and co-generation of chilled air for immediate and delayed cooling when storage tank is full.

E. Generation of Electrical Power and Co-Generation of Chilled Air for Immediate Air Conditioning and Thermal Energy Storage (Delayed Air Conditioning) When Compressed Air Storage Tank is Full:

As shown in FIG. 11, when the compressed air storage tank 5 is full, the excess electrical power from the wind turbine 19 is sent to secondary compressor 34 that boosts atmospheric pressure, which in turn, is sent to turbo compressor 31 and turbo expander 33, which can be used to produce chilled air for the air conditioning system 15, without having to store the wind energy as compressed air in tank 5 first.

As shown in FIG. 2, electric motor 32 is used to power compressor 34, which can be used to compress air, such as to 90-psia, wherein the compressed air is preferably distributed to turbo compressor 31, which is attached to turbo expander 33, on a common shaft 39. Initially, the 90-psia air expanded through the turbo expander 33 causes the turbo expander shaft 39 to rotate the turbo compressor 31 that induces an acceleration of the turbo compressor/turbo expander device until an equilibrium pressure is reached. For a specific design, the 90-psia air output from the compressor 34 is raised to 215-psia by the turbo compressor 31. The 215-psia input air to the turbo expander 33 results in a high mass flow of air that is expanded to ~15 psia. The resultant high mass flow of air becomes extremely cold, i.e., preferably below minus 100 degree F., such as minus 114.8 degrees F. The heat exchangers, 35, 37, which can also be provided in this system, preferably help to keep the air that is being compressed relatively cool, so that the resultant temperature of the chilled air released by turbo expander 33 is not compromised.

The chilled air 50 can then be distributed to the mixing chamber 11, and bubbled through the water, wherein the water is preferably chilled to produce 40 degree F. water and 40 deg F. vented air. Other temperatures can be used, such as when other chilling mediums such as water with additives or other liquids are used. This chilled air is produced without having to store the compressed air energy in tank 5, which might be full, but is preferably produced on an on-going basis, i.e., as the wind turbine 19 is running. The 40 degree F. water is sent to the separation tank 20, where it can be stored and used at a later time. The 40 degree F. vented air from mixing chamber 11 is preferably sent to the HVAC system immediately or it is vented (wasted).

Figure 12:
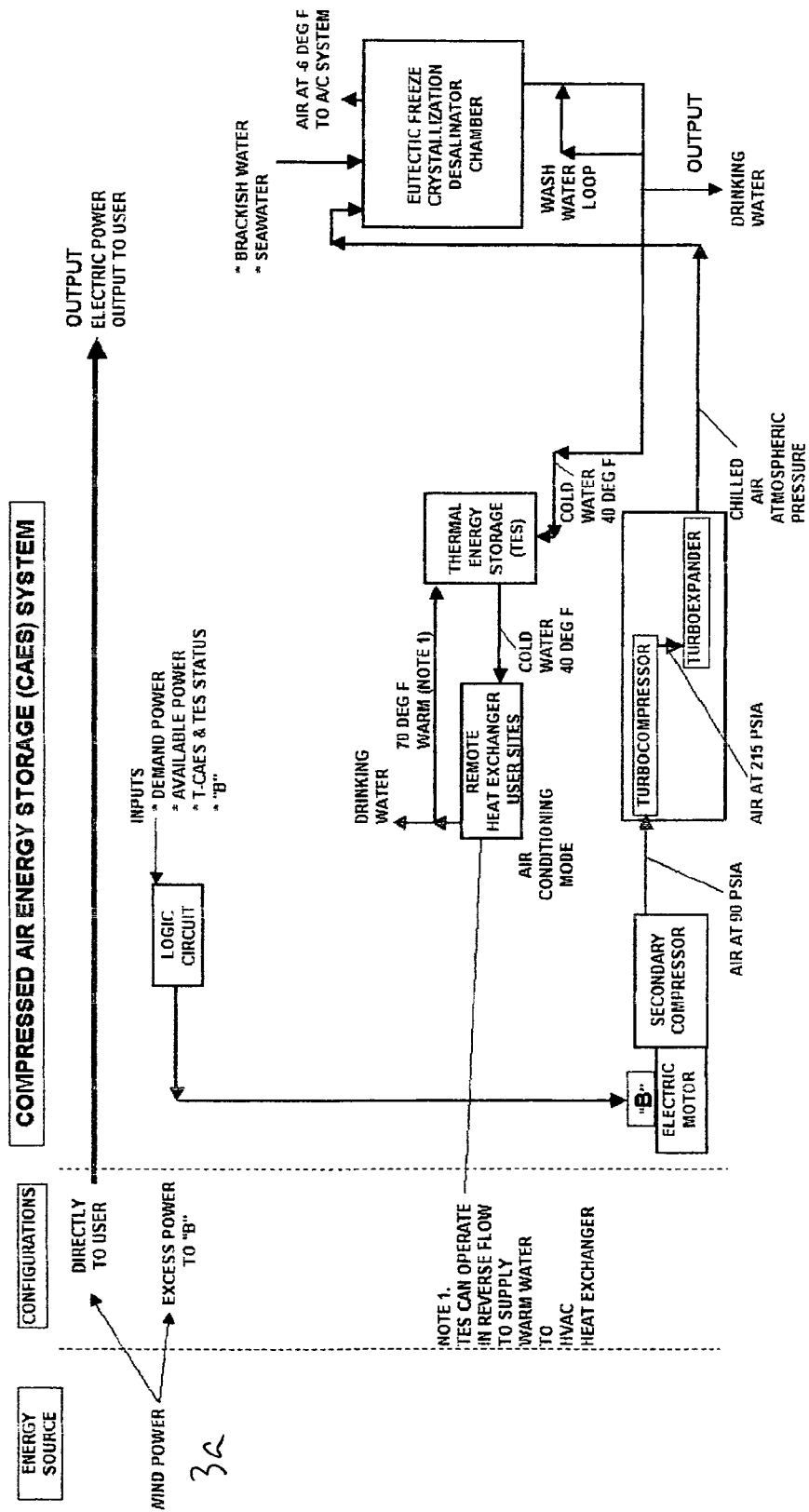
FIG. 12 is a schematic drawing showing the universal component embodiment of FIG. 1, wherein wind power is used to generate electrical power and co-generation of chilled air for desalination, immediate and delayed cooling when storage tank is full.

F. Generation of Electrical Power and Co-Generation of Chilled Air for Desalination, Immediate Air Conditioning and Thermal Energy Storage (Delayed Air Conditioning) when Compressed Air Storage Tank is Full:

As shown in FIG. 12, when the compressed air storage tank 5 is full, and the desalination system 9 is used to produce chilled fresh water from seawater (instead of the mixing chamber 11), the chilled air can be produced in much the same way as in the mode shown in FIG. 11. That is, excess electrical power is sent to a secondary compressor 34 that boosts atmospheric pressure, such as to 90 psia, and then, the 90-psia air is preferably fed to a turbo compressor 31, attached to a turbo expander 33 on a common shaft 39. The 90-psia air expanded through the turbo expander 33 preferably causes turbo expander 33 shaft 39 to rotate turbo compressor 31 that induces an acceleration of the turbo compressor/turbo expander device until an equilibrium steady state pressure is reached. Again, for a specific design, the 90-psia air output from the secondary compressor 34 is raised to 215-psia by turbo compressor 31. The 215-psia input air to the turbo expander 33 results in a high mass flow of air that is expanded to ~15 psia. The resultant high mass flow of air becomes extremely cold, i.e., preferably below minus 100 degree F., such as minus 114.8 degrees F. The heat exchangers, 35, 37, which can also be provided in this system, preferably help to keep the air that is being compressed relatively cool, so that the resultant temperature of the chilled air released by the turbo expander 33 is not compromised.

The difference between this mode and the previous one is that the chilled air can then be distributed to the crystallization chamber 9, rather than mixing chamber 11, wherein the chilled air is used to desalinate seawater, by injecting the chilled air into the crystallization chamber 9, and causing the seawater droplets to be flash frozen, wherein the fresh water ice particles can be removed from the salty brine, as discussed above. This process produces fresh drinking water which has been chilled, preferably to about 40 degree F. water, wherein 40 deg F. vented air is also produced.

This chilled air is produced without having to store the compressed air energy in tank 5, which in this mode is assumed to be full, but is preferably produced on an on-going basis, i.e., as the wind turbine 19 is running. The 40 degree F. fresh water is sent to separation tank 20, where it can be stored and used at a later time by the air conditioning system 15. The 40 degree F. vented air from crystallization chamber 9 is preferably sent to the HVAC system immediately or it is vented (wasted).

In this mode, the settings are preferably made so that the fresh water that circulates to the thermal energy system 13, and then to the air conditioning system 15, re-circulates back, so that it can be withdrawn, and used as fresh drinking water, such as by the facility or any other user. Some of the fresh water that has been warmed by the air conditioner 15 can also be re-circulated back to be used as the melting water for the ice particles that are formed by the desalination system 40.

Note: When the compressed air tank 5 is full, such as in the modes of FIG. 11 or 12, there may also be times when the separation tank 20 has reached optimal cold temperatures, and it can no longer take on any more chilled water. This can happen, for example, when there is no longer any need to run the air conditioning system 15, so the chilled water in the separation tank remains at a constant chilled temperature. In such case, it is contemplated that the system can be adapted to do one or more of the following: 1) send the wind energy to other connected grids that may need the energy, 2) feather the wind turbine fans or blades, 3) provide a load bank for dissipating the energy.

In any of the above operations, any of the other energy sources 3b, 3c, or 3d may be used, such as during non-peak hours, wherein energy can be stored during the low cost rate periods, and used later during high cost rate periods. Also, any desalination system that uses freezing temperatures to freeze water and separate pure water from the impurities, including those that do not use compressed air, but use other freezing techniques, chemicals, etc., can be incorporated into the present system, wherein the exhaust temperatures produced by the desalination system can be used to chill water, which in turn, can be distributed to the thermal energy storage system.

What is claimed is:

1. A cooling system that reduces the end user cost of energy, comprising:
    a compressed air energy storage system that stores energy in the form of compressed air, comprising a primary compressor, a tank and an expander that releases the compressed air, whereby the energy released by the expander generates chilled air,
    a desalination system that removes salt and/or other impurities from seawater comprising a crystallization chamber that uses the chilled air to chill the seawater and form ice particles inside said chamber;
    a thermal energy storage system comprising a separation tank that stores the chilled water derived from the ice particles; and
    an air conditioning system communicating with the thermal energy storage system, wherein the chilled water from said chamber is circulated to the separation tank, and wherein the chilled water from the separation tank is withdrawn, and used to provide cooling for the air conditioning system.

2. The cooling system of claim 1, wherein energy to compress air into the compressed air energy storage system is obtained from at least one of the following energy sources:
    1) wind power from one or more wind turbines;
    2) an electric power grid;
    3) geothermal power; and
    4) nuclear power.

3. The cooling system of claim 1, wherein the cooling system comprises at least one wind turbine to generate wind energy which is used to drive the primary compressor, to compress air into the compressed air energy storage system.

4. The cooling system of claim 3, wherein a generator is provided to co-generate electricity using the compressed air released by said expander and a second generator is provided in association with said at least one wind turbine, wherein electricity produced by said second generator is transmitted in whole or in part to at least one of the following:
    1) a power line leading to a user or grid for immediate use of the electricity;
    2) the compressed air energy storage system;
    3) a secondary compressor system.

5. The cooling system of claim 1, wherein a generator is provided in connection with said compressed air energy storage system and used to generate electricity that is transmitted in whole or in part to a secondary compressor system comprising a secondary compressor, a turbo compressor, a secondary turbo expander, and at least one heat exchanger, and wherein the secondary turbo expander is used to generate chilled air which is distributed to said chamber.

6. The cooling system of claim 1, wherein at least a portion of the compressed air in said tank is 1) distributed to a secondary compressor system, 2) used to provide direct chilled air for the air. conditioning system, and/or 3) used to power pneumatic equipment.

7. The cooling system of claim 1, wherein said crystallization chamber is adapted to allow the seawater to be introduced into said crystallization chamber, in the form of a mist or spray, wherein the chilled air is introduced into said crystallization chamber to cause the mist or spray to be chilled, to form ice particles made from pure water, wherein said crystallization chamber enables salt and other impurities to be removed from the seawater, and for chilled fresh water to be produced thereby.

8. The cooling system of claim 7, wherein the ice particles formed in the crystallization chamber can be melted in a holding tank, wherein additional fresh water is used to melt the ice particles to produce the chilled fresh water.

9. The cooling system of claim 8, wherein the chilled fresh water in the crystallization chamber communicates with the separation tank, and with the air conditioning system, such that the chilled fresh water can help provide cooling for the air conditioning system, and wherein afterwards, the fresh water is withdrawn from the cooling system and made available as fresh drinking water.

10. The cooling system of claim 1, wherein the energy used by the cooling system is obtained during non-peak demand periods, when energy rates are relatively low, and the air conditioning system is operated using the chilled water from the separation tank during peak demand periods, when energy rates are relatively high.

11. The cooling system of claim 1, wherein the separation tank has an upper portion with an upper inlet and upper outlet, and a lower portion with a lower inlet and lower outlet, and wherein the chilled water from said chamber is circulated into the lower portion of the separation tank, through the lower inlet, and wherein the chilled water from the separation tank can be withdrawn from the lower portion of the separation tank, through the lower outlet, to provide cooling for the air conditioning system, and wherein after heat has been exchanged by the air conditioning system, the water from the air conditioning system can be circulated into the upper portion of the separation tank, through the upper inlet, and wherein the water from the upper portion of the separation tank can be circulated back to said chamber, through the upper outlet.

12. The cooling system of claim 1, wherein the energy released by the expander is used to power a generator to produce electricity in addition to generating chilled air.

13. A cooling system that reduces the end user cost of energy, comprising:
- a desalination system that removes salt and/or other impurities from water, wherein the desalination system forms ice particles made from purified water that is separated from the salt and other impurities in the water;
- a compressed air energy system that compresses air and releases it with an expander, whereby the exhaust chilled air generated by releasing the compressed air with the expander chills the water in said desalination system;
- a storage tank that stores chilled water derived from the ice particles; and
- an air conditioning system communicating with the desalination system, wherein chilled water from the storage tank is withdrawn and provides cooling for the air conditioning system wherein the chilled water is passed through the air conditioning system and circulates air to be chilled thereby.

14. The cooling system of claim 13, wherein the storage tank comprises a thermal energy storage separation tank to be filled with water, wherein said separation tank has an upper portion, and a lower portion.

15. The cooling system of claim 14, wherein chilled purified water from the desalination system is circulated into the lower portion of the separation tank, wherein it is withdrawn from the lower portion, to provide cooling for the air conditioning system, and wherein after heat has been exchanged by the air conditioning system, water from the air conditioning system can be circulated and distributed as fresh drinking water.

16. The cooling system of claim 13, wherein energy used to purify the water is used during non-peak demand periods, when energy rates are relatively low, and the air conditioning system is operated using the chilled purified water from the storage tank, during peak demand periods, when energy rates are relatively high.

17. A cooling system that reduces the end user cost of energy, comprising:
- a compressed air energy system comprising a compressor and an expander that releases the compressed air, whereby the energy released by the expander generates chilled air;
- a cooling chamber that uses the chilled air to chill a liquid inside said cooling chamber wherein the cooling chamber comprises a mixing chamber filled with the liquid, and enables the chilled air to be introduced into the mixing chamber in the form of bubbles, wherein the resultant heat transfer causes the liquid in the mixing chamber to become chilled to produce a chilled liquid;
- a thermal energy storage unit comprising a separation tank that stores the chilled liquid; and
- an air conditioning system communicating with the thermal energy storage system, wherein the chilled liquid from the cooling chamber is circulated to the separation tank, and wherein the chilled liquid from the separation tank is withdrawn and provides cooling for the air conditioning system.

18. The cooling system of claim 17, wherein the chilled liquid in the mixing chamber communicates with the separation tank, and with the air conditioning system, such that the chilled liquid provides cooling for the air conditioning system, and wherein the chilled liquid is maintained in a closed loop system, such that it is circulated back from the air conditioning system to the mixing chamber.

19. The cooling system of claim 17, wherein energy to compress air into the compressed air energy system is obtained from at least one of the following energy sources:
1) wind power from one or more wind turbines;
2) an electric power grid;
3) geothermal power; and
4) nuclear power.

20. The cooling system of claim 17, wherein a pressure tank is provided in association with said compressed air energy system to store the compressed air, and wherein an electric generator is provided to produce electricity which is transmitted in whole or in part to at least one of the following:
1) a power line leading to a user or grid for immediate use of the electricity;
2) the compressed air energy system;
3) a secondary compressor system.

21. The cooling system of claim 17, wherein energy used to compress air into the compressed air energy system is used during non-peak demand periods, when energy rates are relatively low, and the air conditioning system is operated using the chilled liquid from the separation tank, during peak demand periods, when energy rates are relatively high.

* * * * *